United States Patent
Luckinbill et al.

(10) Patent No.: US 11,046,515 B2
(45) Date of Patent: Jun. 29, 2021

(54) MULTI ROBOT SYSTEM AND METHOD FOR INTERMODAL CONTAINER TRANSPORT

(71) Applicant: Swarm Robotix, LLC, Naperville, IL (US)

(72) Inventors: Glenn Luckinbill, Aurora, IL (US); Ryan Luckinbill, Aurora, IL (US)

(73) Assignee: Swarm Robotix LLC, Naperville, IL (US)

( * ) Notice: Subject to any disclaimer, the term of this patent is extended or adjusted under 35 U.S.C. 154(b) by 135 days.

(21) Appl. No.: 16/051,017

(22) Filed: Jul. 31, 2018

(65) Prior Publication Data
US 2019/0039826 A1    Feb. 7, 2019

Related U.S. Application Data

(60) Provisional application No. 62/541,018, filed on Aug. 3, 2017.

(51) Int. Cl.
| | |
|---|---|
| *B66F 3/46* | (2006.01) |
| *B65G 1/06* | (2006.01) |
| *B65G 63/00* | (2006.01) |
| *B25J 5/00* | (2006.01) |
| *B25J 9/16* | (2006.01) |
| *B65G 67/60* | (2006.01) |
| *B66F 9/06* | (2006.01) |
| *G05B 19/418* | (2006.01) |

(52) U.S. Cl.
CPC .............. *B65G 1/065* (2013.01); *B25J 5/007* (2013.01); *B25J 9/162* (2013.01); *B65G 63/004* (2013.01); *B65G 67/603* (2013.01); *B66F 3/46* (2013.01); *B66F 9/06* (2013.01); *B66F 9/063* (2013.01); *G05B 19/41895* (2013.01); *B65G 2201/0235* (2013.01); *G05B 2219/31008* (2013.01); *G05B 2219/39146* (2013.01)

(58) Field of Classification Search
CPC .................................. B66F 9/063; B66F 3/46
See application file for complete search history.

(56) References Cited

U.S. PATENT DOCUMENTS

| | | | |
|---|---|---|---|
| 5,800,114 A * | 9/1998 | Secondi | B66F 3/46 |
| | | | 280/43.23 |
| 5,863,086 A | 1/1999 | Christenson | |
| 7,344,037 B1 * | 3/2008 | Zakula, Sr. | B66C 13/46 |
| | | | 212/270 |

(Continued)

FOREIGN PATENT DOCUMENTS

| | | |
|---|---|---|
| EP | 3135441 A1 | 4/2016 |
| WO | WO 2005/120895 | 12/2005 |
| WO | WO-2016/166308 A1 | 10/2016 |

OTHER PUBLICATIONS

PCT International Search Report, PCT/US18/44664.
PCT International Preliminary Report On Patentabihty, PCT/US18/44664.

*Primary Examiner* — Jonathan Snelting

(57) ABSTRACT

A system and method for intermodal container transport that utilizes swarm intelligence and the autonomous locating, lifting, supporting and moving via robots working in conjunction. A port central command locates and releases robots to the container location and then transports the container to its destination.

20 Claims, 22 Drawing Sheets

(56) References Cited

U.S. PATENT DOCUMENTS

| | | | |
|---|---|---|---|
| 8,789,635 B2* | 7/2014 | Franzen | B60K 1/04 |
| | | | 180/68.5 |
| 8,845,266 B1 | 9/2014 | Ward et al. | |
| 8,892,253 B2 | 11/2014 | Park et al. | |
| 8,915,692 B2* | 12/2014 | Grinnell | B66F 9/063 |
| | | | 414/551 |
| 9,352,944 B2* | 5/2016 | Fagan | B66F 13/00 |
| 9,410,804 B2* | 8/2016 | Rintanen | G01S 7/4808 |
| 9,637,327 B1 | 5/2017 | Kun | |
| 9,950,916 B2* | 4/2018 | Jaipaul | B66F 3/46 |
| 10,093,526 B2* | 10/2018 | D'Andrea | G06Q 10/08 |
| 10,434,924 B2* | 10/2019 | Alfaro | B60G 3/08 |
| 2009/0238669 A1 | 9/2009 | Hathaway et al. | |
| 2016/0260161 A1* | 9/2016 | Atchley | G01C 21/206 |
| 2017/0129503 A1 | 5/2017 | Meissner | |
| 2017/0129747 A1 | 5/2017 | Russell et al. | |

* cited by examiner

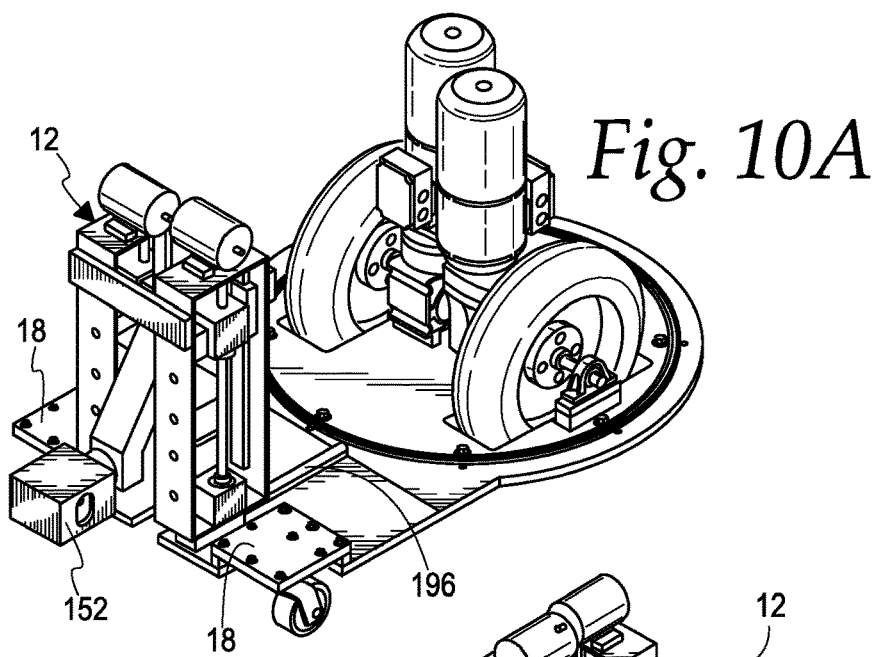
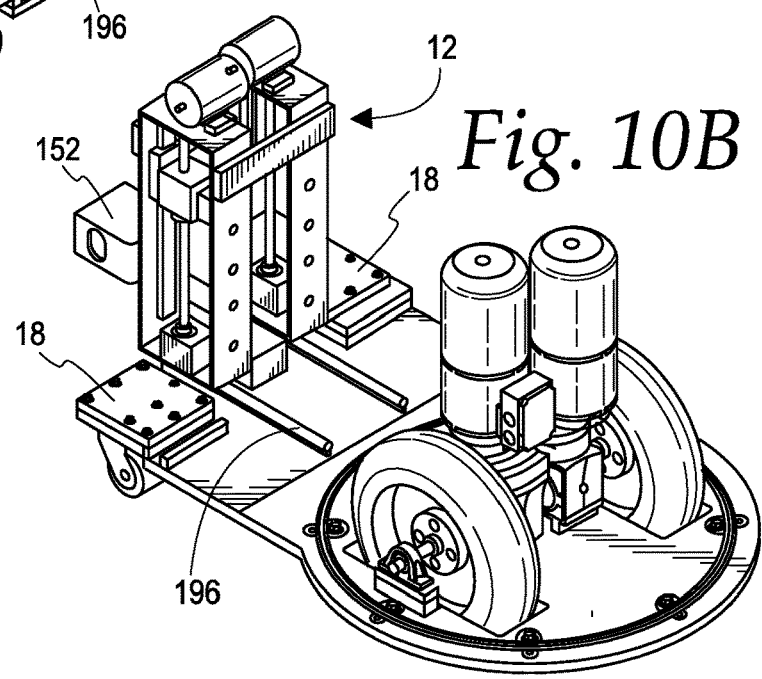
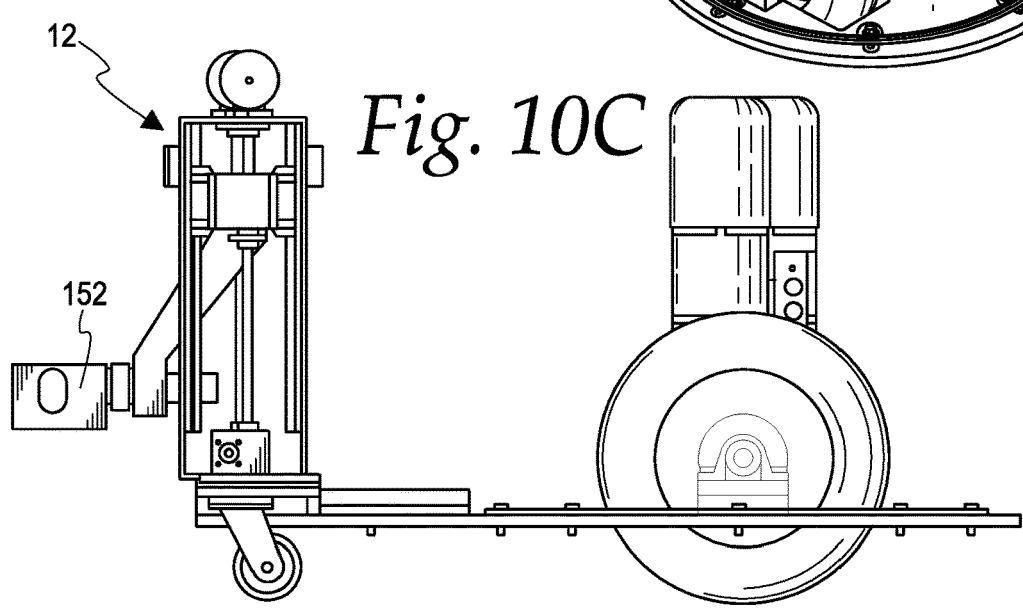

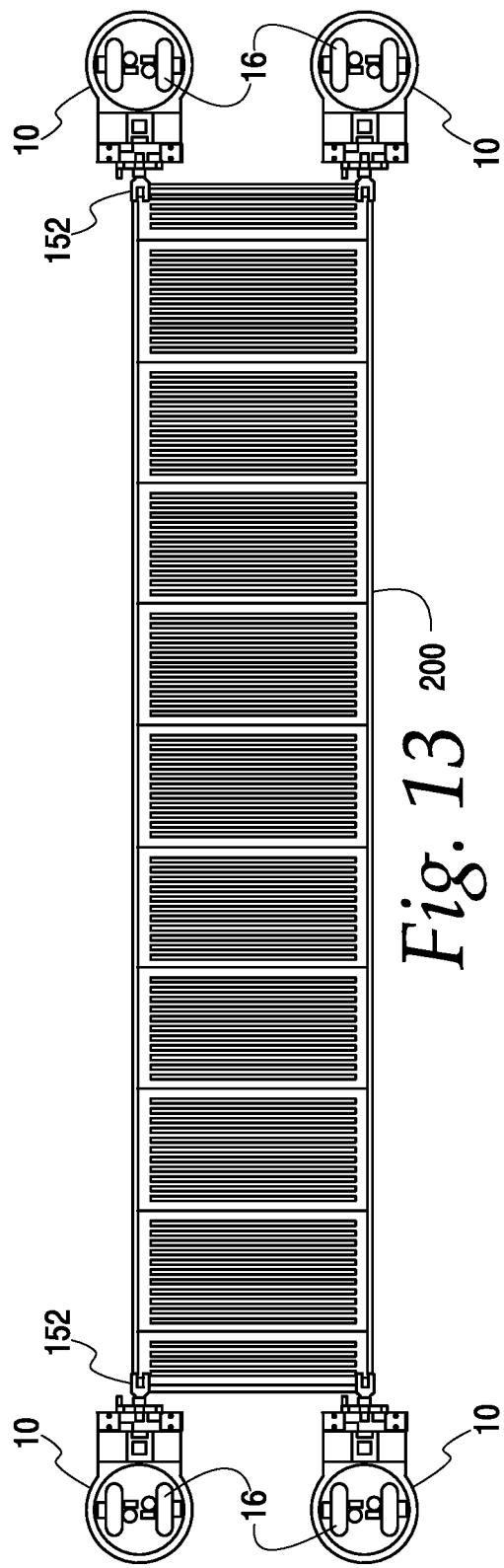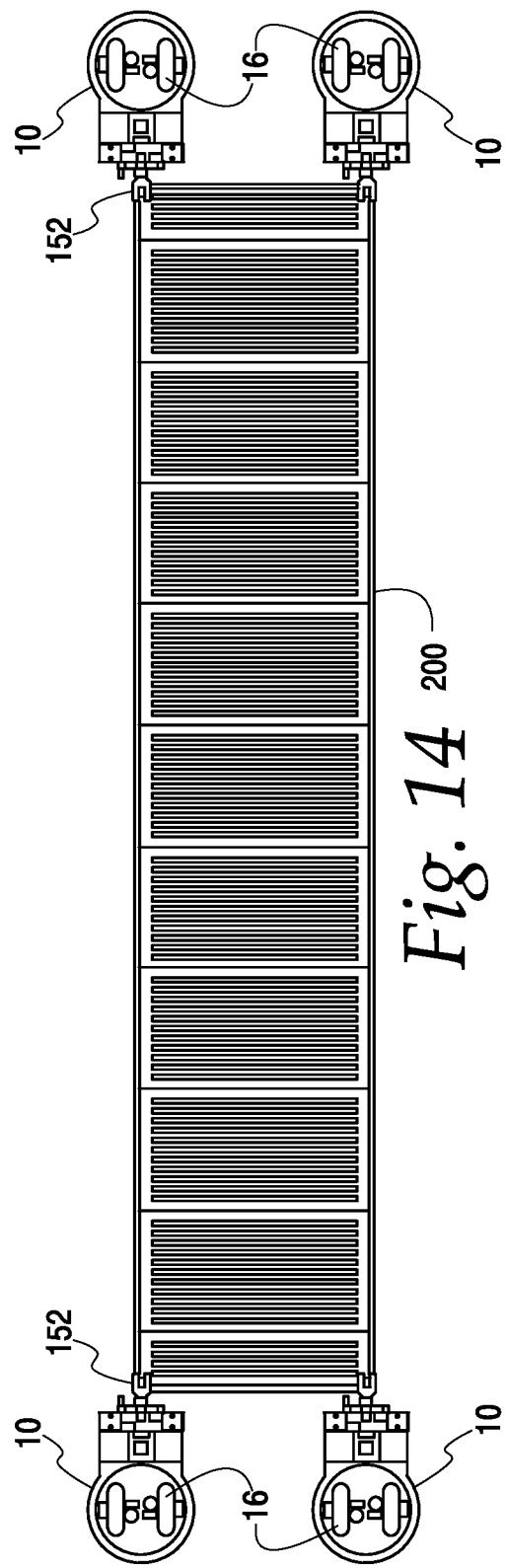

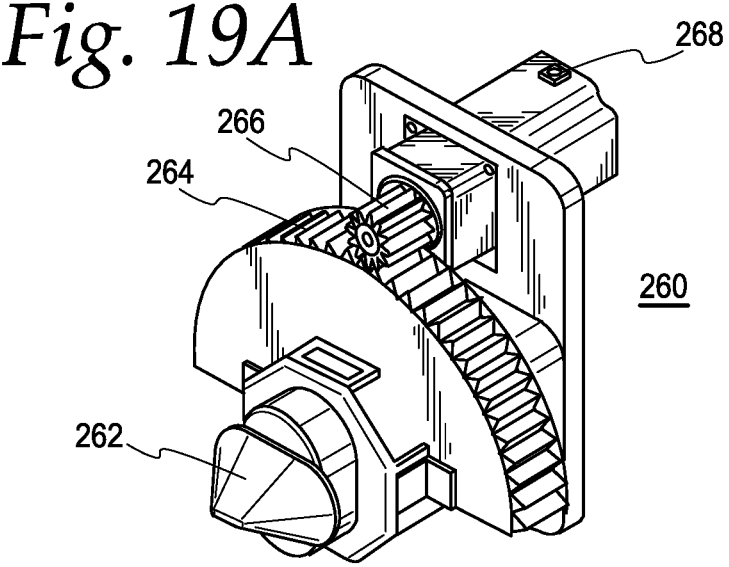
Fig. 19A
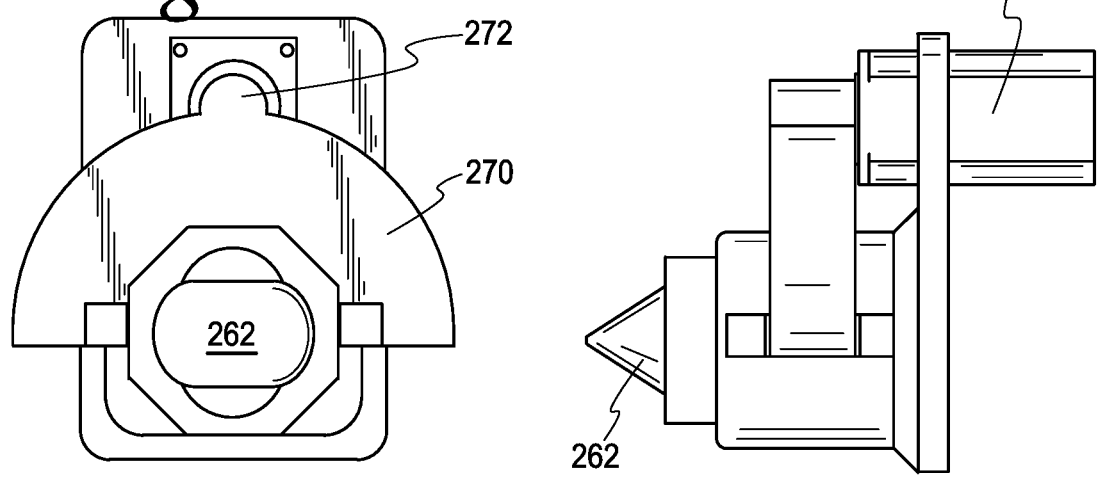
Fig. 19B
Fig. 19C
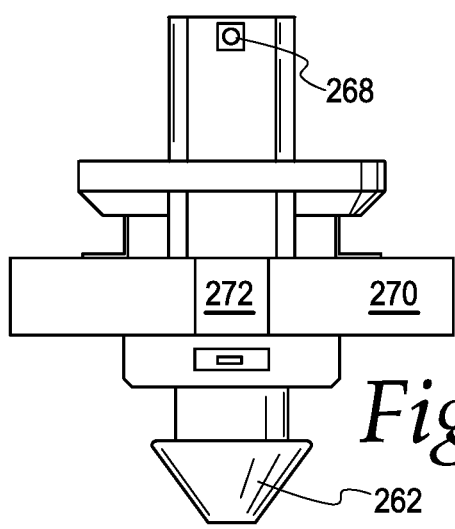
Fig. 19D

MULTI ROBOT SYSTEM AND METHOD FOR INTERMODAL CONTAINER TRANSPORT

CROSS-REFERENCE TO RELATED APPLICATION

This application claims the benefit of priority under USC § 119(e) of provisional application No. 62/541,018, filed Aug. 3, 2017, entitled "Multi Robot System for Intermodal Container Transport", hereby incorporated by reference herein.

BACKGROUND OF THE INVENTION

I. Field of the Invention

The present disclosure relates generally to the transfer and movement of international shipping containers in port and transfer terminal facilities. More particularly, it relates to the autonomous movement of these containers through the use of multiple robots to optimize logistics at such port and transfer terminals.

II. Description of the Prior Art

Intermodal containers, typically used for the worldwide transport of freight, are manufactured according to specifications from the International Organization for Standardization (ISO), and are therefore suitable for multiple transportation methods such as truck, rail, or ship. Intermodal containers can be up to 53 feet (16.15 meters) long and can weigh in the range of 35-40 tons (31.8-36.3 metric tons) when fully loaded.

There is a plethora of cargo shipped, staged and stored within such containers throughout the world on a daily basis. In particular, approximately 90% of non-bulk cargo worldwide is transported via such intermodal shipping containers arranged on ships. It is established that almost a trillion dollars of this cargo goes through American ports yearly. Indeed, as more and more countries join the importing/exporting of cargo, some ports can regularly receive ships carrying up to 14,000 intermodal containers. Unfortunately, most ports, are in no way capable of handling such volume. In fact, the recent increase in container receptions along with the outdated infrastructure of these port systems has led to domestic economic losses of up to 37 billion dollars.

This incredible amount of shipping activity more often than not leads to extreme backups, and accordingly, the aforementioned economic losses stemming from port inefficiencies. This inefficiency primarily comes from the outdated usage of trucks and drivers to move containers from the ship to the staging and storing areas. It is not atypical for these drivers to sometimes wait for up to eight hours in line to move one container. As they are generally paid on a per container basis, this leads to a shortage of labor in the industry as drivers are discouraged from working at this slow of a pace.

When these containers arrive at ports (either by land or by sea) they must be transferred onto or from the ships, trains, and trucks. Transferring containers from one mode of transportation to another is time and energy intensive. For example, transferring these ISO containers from ships consumes a large amount of time and often leads to port congestion and container backlog as they are often conducted at the ground level with various mechanical machines such as cranes, trucks, forklifts, and straddle carriers. Furthermore, the current methods of transferring intermodal shipping containers require a large amount of ground space for maneuvering the containers into place, and ground space is a premium at and around these busy ports.

More specifically, current port systems consist of a ship to shore crane which brings the containers to a staging area near the ship. These containers are then loaded by crane onto a pedestrian controlled truck chassis which transports the container to a storage area where it awaits further movement. An inland crane then stacks the containers until they are ready to be transported out of the port. The inefficiency comes when truck chassis are backed up and form a traffic jam as the drivers wait for their load to be taken. The wait time leads to economic loss and environmental damage as many of these trucks are not environmentally friendly and are generally older trucks that have been regulated to the short transport throughout a port.

To alleviate some of these problems, the use of overhead rail transport systems have been suggested. Such an overhead monorail solution provides advantages that would significantly improve container port operations. However, such a system is not without its challenges. One challenge, in particular, includes the limited positioning capabilities of containers with such an overhead rail. More specifically, container positioning is limited to such spaces throughout the port wherein a rail is overhead.

What is needed is a carrier system for efficient handling and transferring of ISO containers from one form of transportation to another and transporting such containers from one area to another (e.g. port area to island terminals). What is further needed is a system suited for close tolerance positioning and alignment of containers. Specifically, what is needed is a system of swarm robots who work in conjunction to transport the intermodal containers throughout the port. The system will bring efficiency to the ports while also utilizing low emission drive systems, hereby lowering the environmental impact of the current ports.

Accordingly, it is a general object of this disclosure to provide systems, methods and apparatuses for addressing the deficiencies of the current practices regarding issues associated with intermodal container transfer and movement.

It is a general object of this disclosure to provide systems, methods and apparatuses that are simple, easy to use and familiar for port and transfer facility use.

It is another general object of this disclosure to provide cost effective systems, methods and apparatuses in swarm intelligence to transport intermodal containers throughout the port.

It is more specific object of this disclosure to provide multi robot systems, methods and apparatuses for intermodal container transport.

It is another more specific object of this disclosure to provide systems, methods and apparatuses for close tolerance positioning and alignment of intermodal containers.

It is yet another specific object of this disclosure to provide multi robot systems, methods and apparatuses for simultaneous multiple intermodal container transport.

A further object of this disclosure is to provide multi robot systems, methods and apparatuses in communication with automated port systems.

A further object of this disclosure is to provide a robotic system in communication with a port tracking system for intermodal containers These and other objects, features and advantages of this disclosure will be clearly understood through a consideration of the following detailed description.

SUMMARY OF THE INVENTION

According to an embodiment of the present disclosure, there is provided a system for transport of an intermodal container including a central command server having container location information including a start and a stop location. Two or more autonomous robots are each capable of communicating with the server and with each other through a network such that said robots locate the container at the start location, engage the container, lift the container and then transport the container to the stop location.

There is also provided a swarm robot configured to collaborate and communicate with at least a second swarm robot to transport an intermodal container. The robot having a drive module for traversing the robot and a container corner casting engagement member for engaging and lifting the container to enable transport thereof.

There is also provided a method for transport of an intermodal container comprising the steps of establishing communications between a central command server and two or more autonomous robots through a network, sending container location information to the robots, the robots engaging the container, lifting the container and then transporting the container to the destination.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 10A is a perspective view of the lift system of the robot of FIG. 1.

FIG. 10B is a rear perspective view of the lift system of FIG. 10A.

FIG. 10C is a side view of the lift system of FIG. 10A.

FIG. 13 is a top plan view of FIG. 12.

FIG. 14 is a top plan view of FIG. 12 with the robots at an internal drive train angle of forty-five degrees.

FIG. 19A is a perspective view of an alternate embodiment of a twist lock according to the principles of the present disclosure.

FIG. 19B is a front view of the twist lock of FIG. 19A.

FIG. 19C is a side view of the twist lock of FIG. 19A.

FIG. 19D is a top view of the twist lock of FIG. 19A.

DESCRIPTION OF THE PREFERRED EMBODIMENTS

The following description of the preferred embodiments is merely exemplary in nature and is in no way intended to limit the disclosure, its application or use. These exemplars are merely used to better describe the true spirit and scope of the present disclosure.

The present multi robot system for intermodal container transport includes robots working together to locate, engage, lift and move shipping containers. However, it will be understood that the swarm intelligence system as disclosed herein is in no way limited to shipyard shipping containers and ports, nor with such ISO intermodal containers. Indeed, the system can be used for any type of container distribution and transport to further transport or storage (i.e. warehouse, distribution center, etc.).

In any event, and in keeping with the shipyard and port example, a port is typically both extremely busy and congested. Any number of containers are stored and/or are being transported at any given time while at the same time any number of ships are delivering even more containers that also have to be transported and perhaps stored. Accordingly, each port has an accounting and positioning system for keeping track of each container. So, as each container is removed from the ship (via crane or otherwise) and is placed on the ground (or another container support surface) to await further transport, the port accounting and positioning system, whether fully automated, partially automated or otherwise determines when and how the new container is transported.

The system of the present disclosure now makes possible the complete automation of, for example, container ports, rail yards and distribution centers. Essentially, the system optimizes port (for example) movement through the autonomous movement of containers via multiple robots. It is a heavy-payload multi-robotic system for moving international shipping containers. In the abstract, a system of robots work in conjunction to lift and transport a standard intermodal shipping container. Such robots may include wheels; a drive system/module controlled by a central processing unit; a lift mechanism; a locking mechanism to connect to a corner of the container; a communications system/module coupled to an external command center; and a communication system between robots.

Figure 1A:
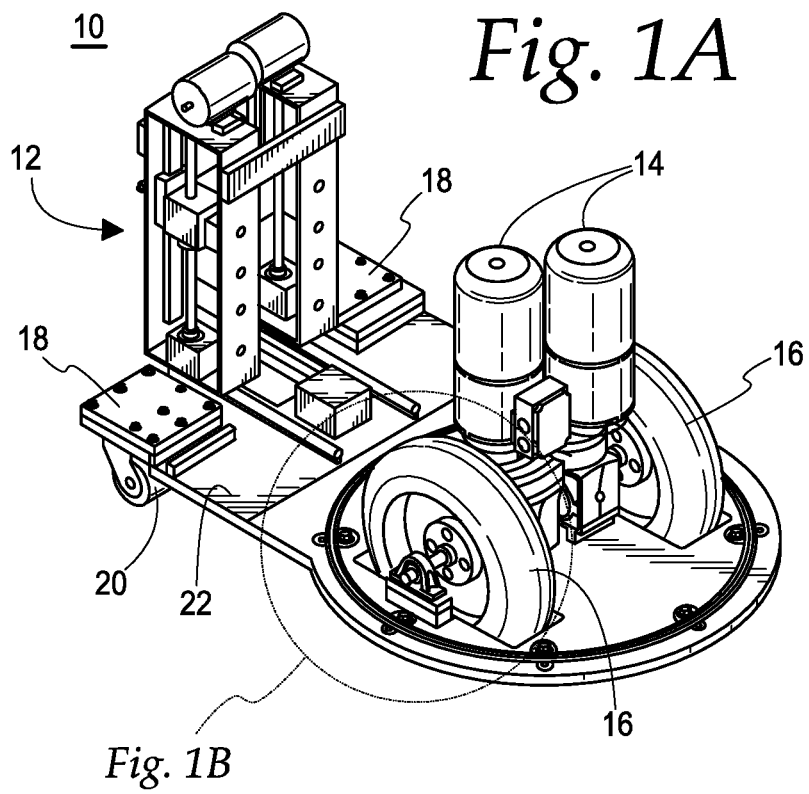
FIG. 1A is a perspective view of a robot according to the principles of an embodiment of the present disclosure.

Turning now to the drawings, and in particular FIG. 1A, a robot 10 according to the principles of an embodiment of the present disclosure is illustrated. The robot 10 includes a lift assembly 12, drive motors 14, drive wheels 16 and container supports 18. In use, the drive motors 14 control the movement of the drive wheels 16 to propel the robot 10, and the lift assembly 12 lifts a container by connecting to the corner casting of the container and resting the container on the supports 18. Caster wheels 20 are coupled to the frame plate 22 of the robot and both help with support and movement.

Figure 1B:
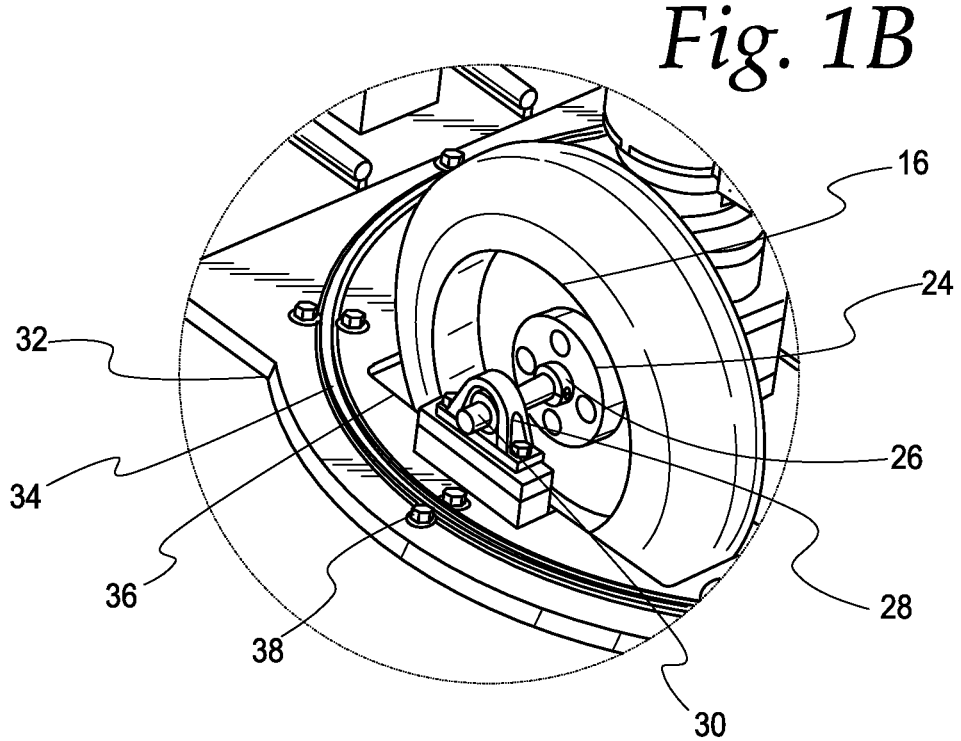
FIG. 1B is an enlarged view of the outer bearing and motorized wheel of the robot of FIG. 1A.

The enlarged view of FIG. 1B better illustrates the outer bearing and motorized wheel 16 of the robot 10 of FIG. 1A. The wheel 16 assembly includes a hub 24, a shaft collar 26, a drive bearing 28, a drive shaft 30, an outer race 32, a plate (or swivel) bearing 34, an inner race 36 and bolts 38 to secure the bearing to the plate. The outer race 32 is a base plate that holds the lift system 12 and caster wheels 20, while the inner race 36 is a circular baseplate, inside the circle of the outer race 32, that holds the drive system 14 and the battery rack. In use, the swivel bearing 34 allows the outer race 32 and attached lift mechanism 12 to rotate independent of the inner race 36 and the drive subsystem and enables zero degree turns.

When an ISO container, for example, is removed from the ship and initially positioned on the ground or other support surface of the port, it then needs to get transported to the appropriate destination. The present system can accomplish control of this transport of a container from a start (initial, etc.) position/location to a stop (final, storage, etc.) position/location in a number of ways. It can be done through the use of a central processor, either alone or in cooperation with the port location accounting and positioning system and with or without human operation. It can also be done through the robots doing all of the algorithms, the so-called distributed method instead of central processing method. In any event, both methods will be using the collective intelligence of multiple robots working together to transport the containers.

In certain environments, traditional wireless based systems are ineffective due to, for example, obstructions (i.e. metal shipping containers), which deteriorates the quality of the wireless signals. As a result, extra latency and packet loss may occur, which can be detrimental to critical robotic systems. An embodiment of the present disclosure utilizes a mesh wireless system to increase signal resiliency in environments that would otherwise render wireless systems useless. A central command server communicates with the closest robot, which is then responsible for commanding other nearby robots to perform a common task. The robots directly communicate with each other through the so-called wireless mesh system, with server communications being done through the closest robot.

Figure 2:
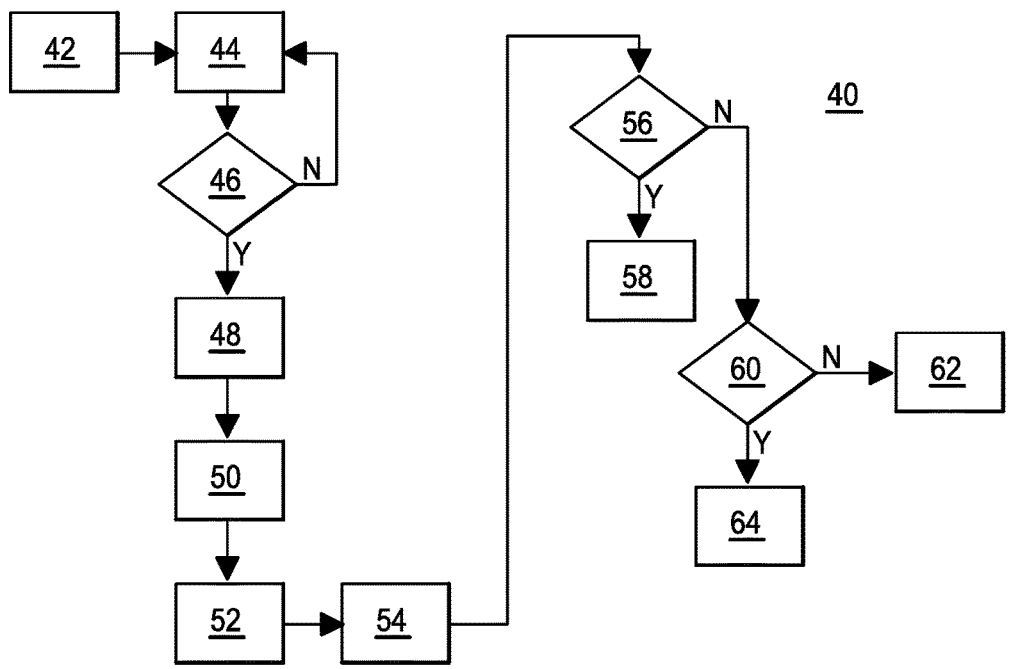
FIG. 2 is a simplified logistic flow diagram of a communication network between robots and a server according to an embodiment of the present disclosure.

More specifically and referring now to the logic flow diagram of FIG. 2, a network diagram 40 is illustrated. First, upon delivery of the container from the ship, a job request is submitted 42 in the central command server, and the central command server locates 44 available robots and determines 46 if enough are available to complete the job. If not, the server looks again 44. If there are enough robots, a job request is sent 48 to the closest robot and the first (closest) robot establishes connections (communications) 50 with the other robots. The robots then communicate with each other and synchronize 52 their progress while the first robot maintains the connection 54 to the central command server. The network determines 56 if the first robot can maintain a connection with the server. If so, the job is continued with progress relayed 58 to the central command center. If not, it is determined 60 whether a job is in progress. If a job is not in progress the robot stops 62 moving and attempts to re-establish the connection to the server. If a job is in progress, the robots finish 64 the current job and attempt to re-establish the connection to the server.

Figure 3:
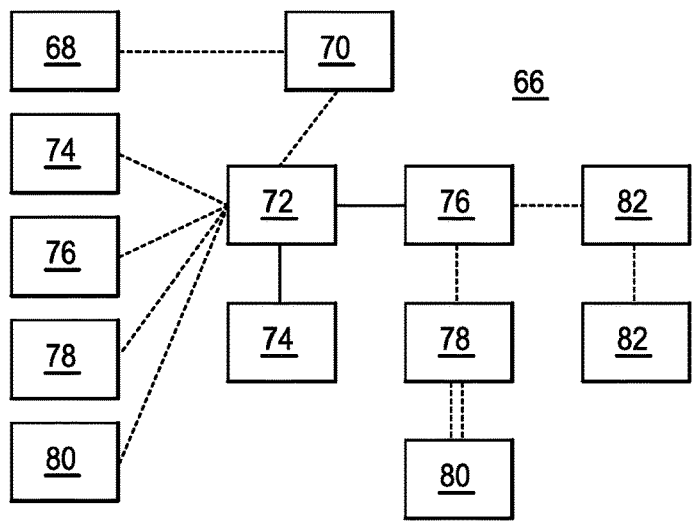
FIG. 3 is a simplified logistic flow diagram of the communications between hardware components according to an embodiment of the present disclosure.

Furthermore, and as illustrated in the exemplar network map 66 of the logic flow communications of FIG. 3, the network map 66 showcases how the hardware communicates with each other. All of the given standards and connections (e.g. WiFi, PWM, Ethernet, Serial Bus, Bluetooth, etc.) may be used and it will be understood that connection methods and modes are subject to advance and change so long as the communications are between a server and a robot through other robots. In other words, the system is able to bounce the signal from one robot to another until a communication reaches the intended target. Use of this mesh also enables the robots to directly communicate with one another when performing movements and actions that require swarm intelligence and communication.

Robots may be assigned to teams of two, three or four, for example, with one so-called "lead" robot per team. The lead robot will be responsible for talking with the server and instructing the other robots. The lead robot will be continuously and constantly communicating with the master server while it is powered on. The lead robot will send a status packet to the master server in each control cycle. The status packet will contain all necessary information that both the master server needs to know in order to assign jobs, as well as information that a port-side operator would need to see. The exact data to be transmitted is outlined in the implementation. During each control cycle, the other so-called "slave" robot(s) in a group will send a status packet to the lead robot containing all necessary information the lead robot will need to know. During each control cycle, the lead robot will send a status packet to the slave robot(s).

The network map 66 includes a server 68 in wireless (WiFi or Bluetooth) communications with a central router 70 in wireless (WiFi or Bluetooth) communications with a wireless bridge 72 in wireless ((WiFi or Bluetooth) communications with a first robot 74, a second robot 76, a third robot 78 (if applicable) and a forth robot 80 (if applicable), etc. The wireless bridge 72 is in communications (i.e. Ethernet) with a mesh computer (e.g. LiDAR) 74 for vision as well as with a main CPU (e.g. Rasberry Pi) 76. The main CPU 76 is further in communications (i.e. Serial Bus) with a secondary processing unit (e.g. Arduino) 78 which is in communications (i.e. Digital) with a non-mesh computer vision (e.g. Ultra-Sonics) 80. The main CPU 76 is also further in communications (i.e. PWM) with the variable frequency drive motor controllers 82.

Figure 4:
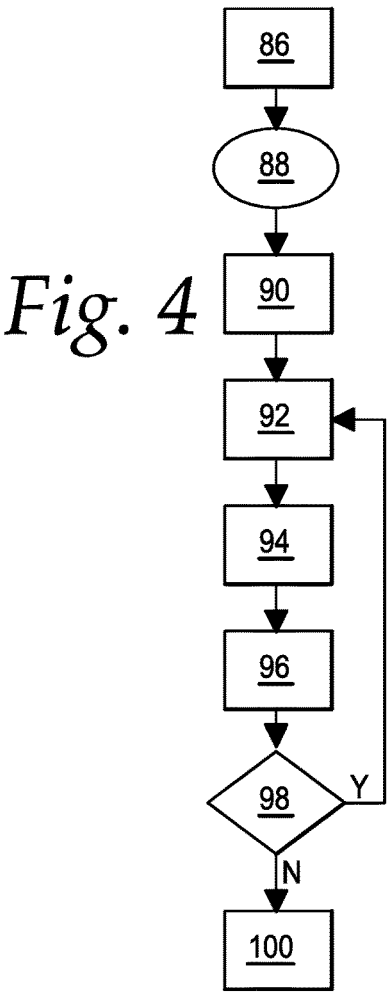
FIG. 4 is a simplified logic flow diagram of a safety and obstacle avoidance protocol of a robot according to the principles of an embodiment of the present disclosure.

Turning now to FIG. 4 and the robot safety and obstacle avoidance protocol 84, the robots path to and from a job request (or otherwise) is illustrated. While the robot is moving it is always scanning its environment and although it started its trek with a precise path it needs to be capable of altering that path in the event of environmental circumstance. Accordingly, should a robot encounter an object 86 within a variable distance (i.e. x meters) the obstacle avoidance procedure is initiated 88. Depending upon the environment, the robot chooses a direction to drive around 90 the object, scans the object boundary 92, plots a path 94 at least d meters (variable) away from the object boundaries and then follows that detour path 96. The robot then determines whether the path is still blocked 98. If it is, the robot scans 92, plots 94 and follows the detour path 96 again. If it is not blocked, the robot resumes navigation to the destination 100.

Figure 5:
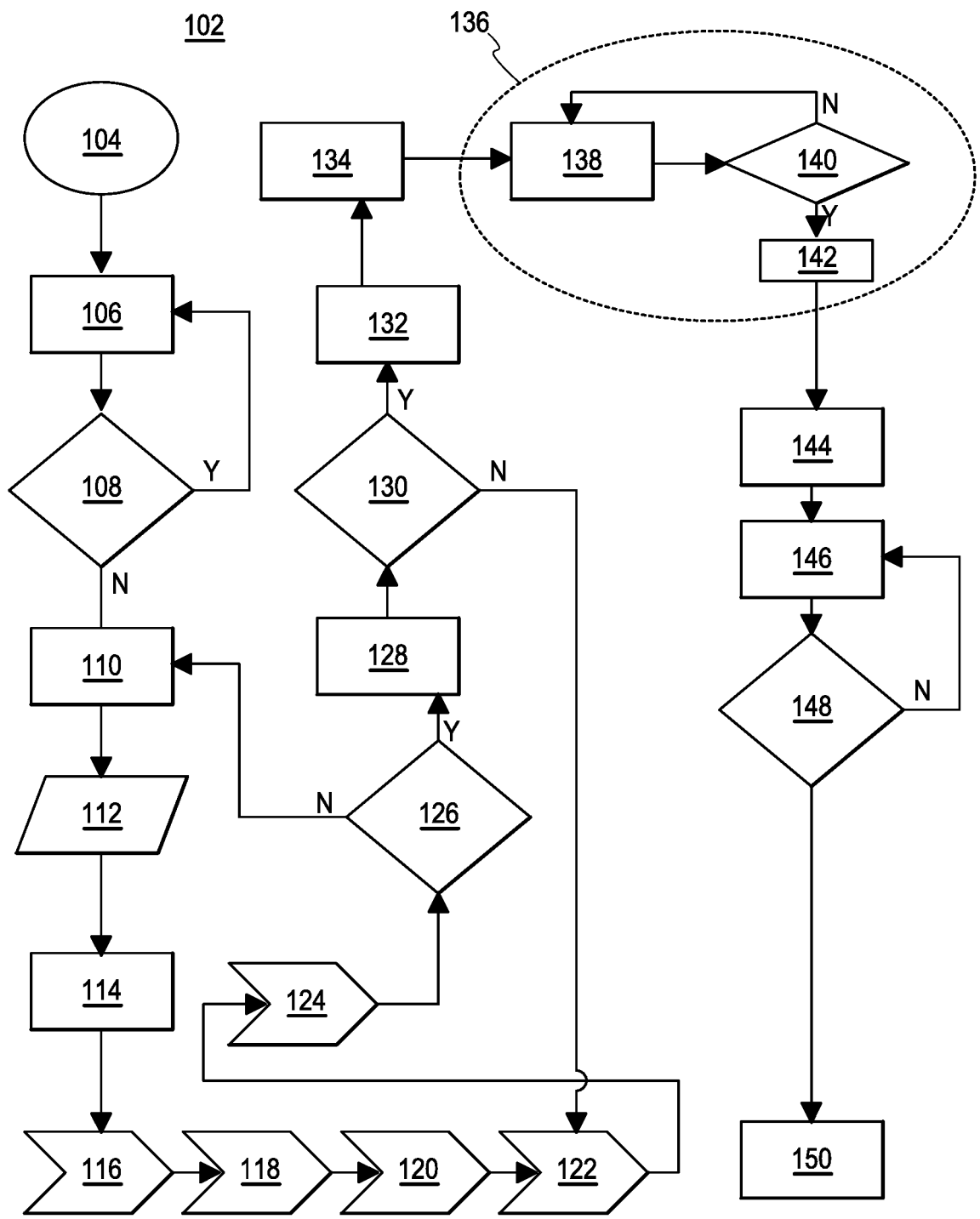
FIG. 5 is a simplified logic flow diagram of a container corner location and locking by a robot according to the principles of an embodiment of the present disclosure.

One of the goals of the present disclosure is to autonomously transport containers. As such, the robots need to target a part of the container to engage, lift, support and transport. In the present example of an ISO intermodal container the robot needs to locate and target a container corner casting. This algorithm is illustrated in the container corner find/lock protocol 102 of FIG. 5. This algorithm takes the robots from being assigned to a corner of the container to actually targeting and locking onto the container corner casting. Critical to this embodiment is how corners and edges are identified. This can be accomplished via LiDAR point data on a 2D field, for example.

By way of example, robots are assigned 104 to a container and each navigate 106 thereto. During navigation it is determined 108 whether GPS and/or NAVIS (or the like) can improve navigation accuracy. If so, it is utilized to navigate 106. If not, then the robot arrives and scans 110 the container. LiDAR data is collected 112 by the robot and then data is shared 114 between all the robots. In order to find an edge each data point is connected to its nearest, second nearest and $n^{th}$ nearest point 116. All connections greater than x (variable) are pruned 118, independent meshes of points are identified 120 and an arbitrary point in the mesh is chosen 122. The point and next closest point to the previous one is appended to a linear regression 124. It is then determined whether successive appends result in a change in "r^2>b" 126. If not then the robot scans again 110. If so, then an edge has been found 128. It is then determined whether all four edges of the container have been found 130 by the robots. If not, then an arbitrary point in the mesh is chosen 122 again. If so, then the robots move to rough corner locations 132. The robot then displaces 134 itself from the geometric corner of the container before entering the control loop feedback 136 steps. The robot uses stereo cameras, LiDAR and Ultrasonics to verify 138 locations and determines 140 whether the corner castings line up. If not, the PID loop is run and locations are verified 138. If so, PID is exited 142 and the robot moves forward to engage 144 the container with the twist-lock. The algorithm then waits for all robots to lock 146 and determines whether they have all locked in 148. If not, the system continues to wait 146. If so, then the container is lifted 150.

Figure 6:
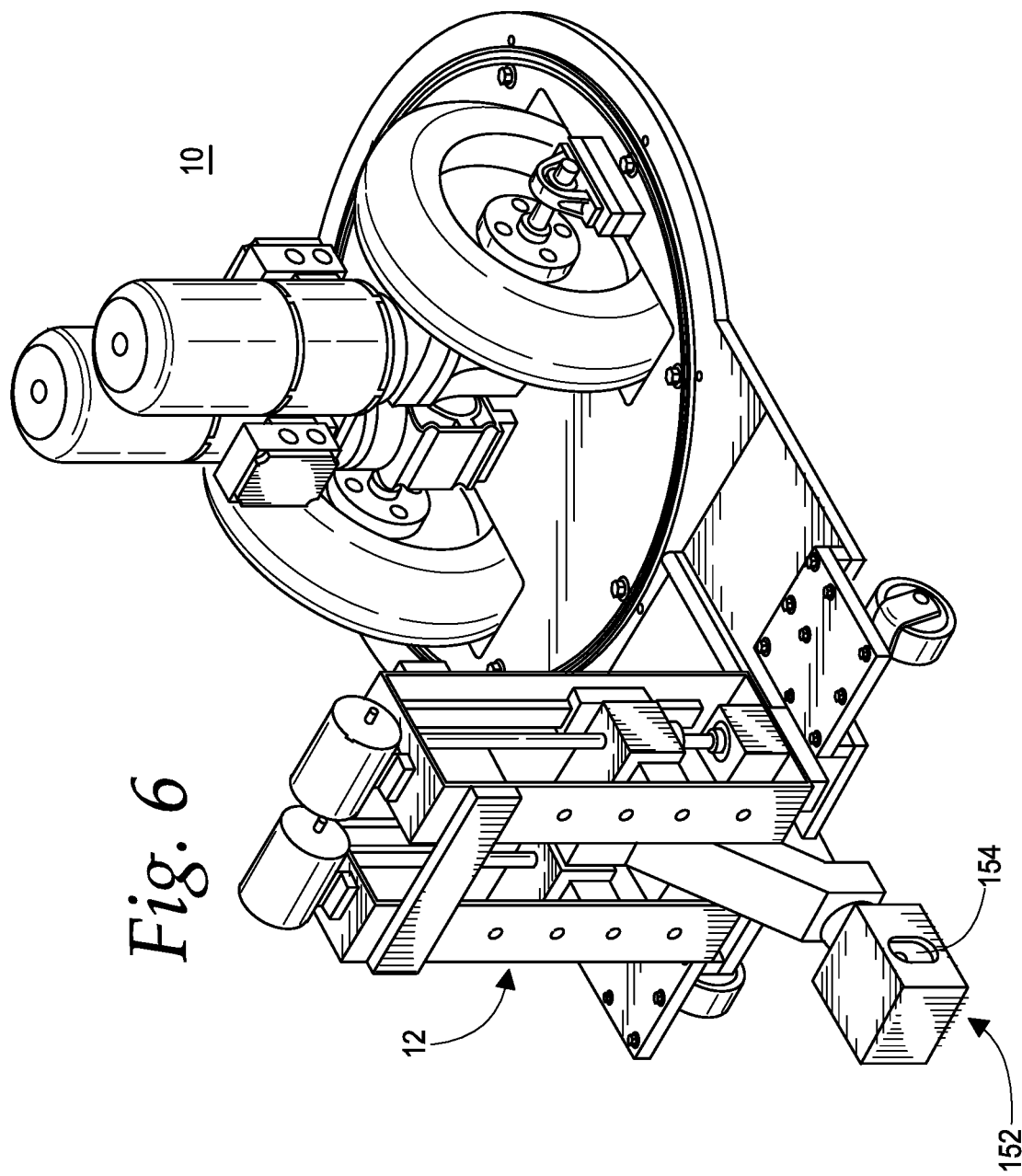
FIG. 6 is a perspective view of the robot of FIG. 1 locking into the corner of the container.
Figure 7A:
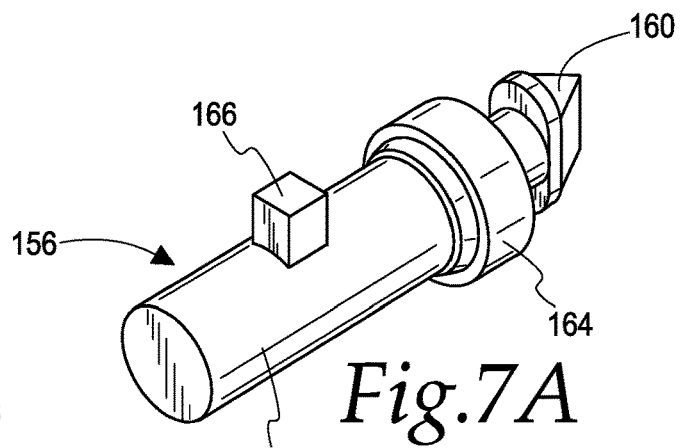
FIG. 7A is an enlarged perspective view of a twist lock of a robot according to the principles of an embodiment of the present disclosure.
Figure 7B:
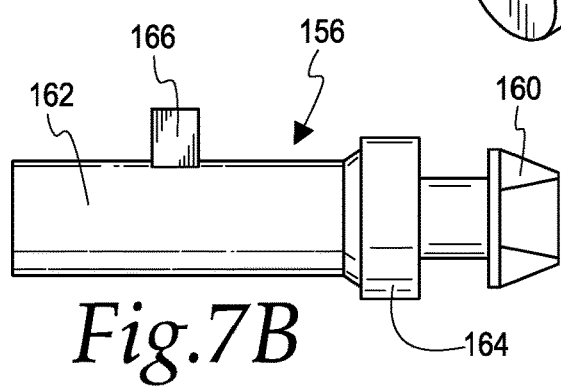
FIG. 7B is a side view of the twist lock of FIG. 7A.
Figure 7C:
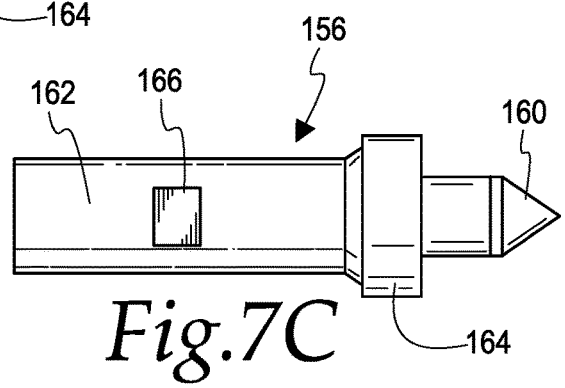
FIG. 7C is a top plan view of the side lock of FIG. 7A.
Figure 7D:
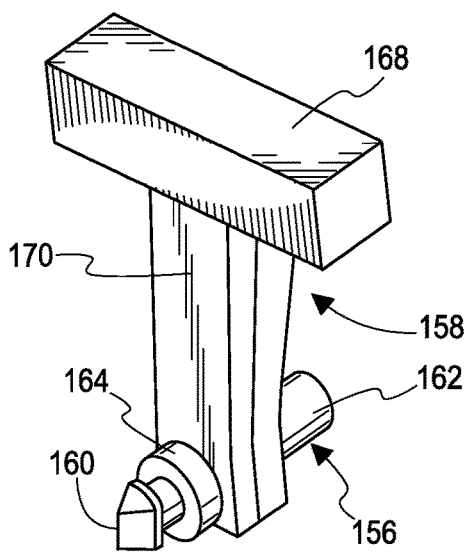
FIG. 7D is a perspective view of a twist lock and holder of a robot according to the principles of an embodiment of the present disclosure.
Figure 7E:
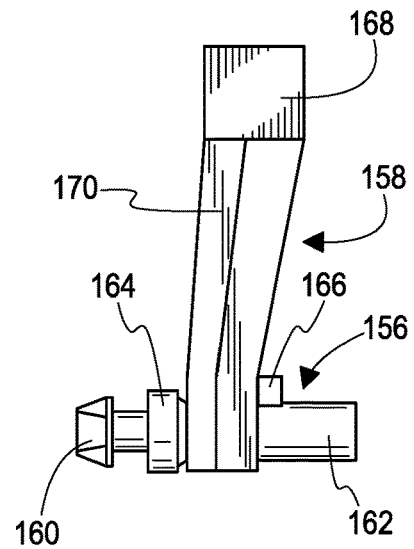
FIG. 7E is a side view of the twist lock and holder of FIG. 7D.

Referring now to FIG. 6, the robot 10 is shown engaged with a corner casting 152. It will be appreciated that for illustrational purposes only the corner casting 152 (and not the container as a whole) is shown; and that each container includes four corner castings that each have two apertures 154. In any event, the lift assembly 12 locks into the corner casting and lifts the container without explicit human command.

The twisklock and holder of the lift assembly 12 will now be described as shown in FIGS. 7A-E. Essentially, the element includes a twistlock 156 (FIGS. 7A-C) and a twistlock holder 158. The twistlock includes an engaging end 160, a cylindrical member 162 with a collar 164 and a stop 166; while the holder includes a horizontal support 168 and an arm 170. In use, the engaging end 160 is inserted into the aperture 154 (FIG. 6) of the corner casting and rotated ninety (90) degrees (FIG. 7C) to lock therein with the holder shaped to distribute the force of the weight of the corner casting and intermodal container when lifted.

Figure 8A:
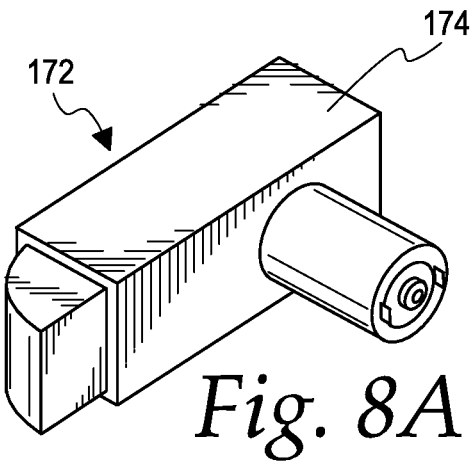
FIG. 8A is an enlarged perspective view of a lock assembly of a robot according to the principles of an embodiment of the present disclosure.
Figure 8B:
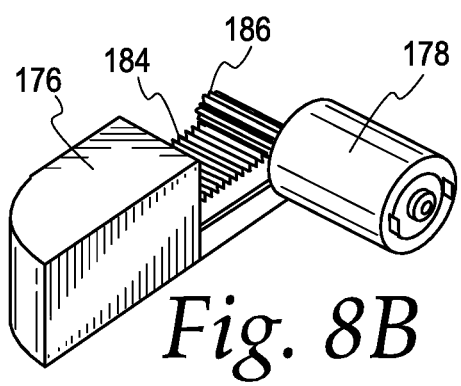
FIG. 8B is a perspective view of the lock piece of FIG. 8A.
Figure 8C:
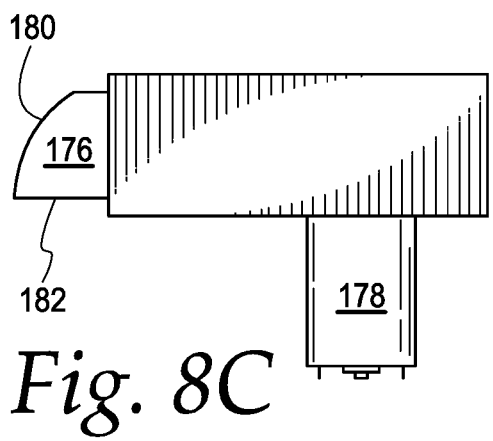
FIG. 8C is a top plan view of the lock assembly of FIG. 8A.
Figure 8D:
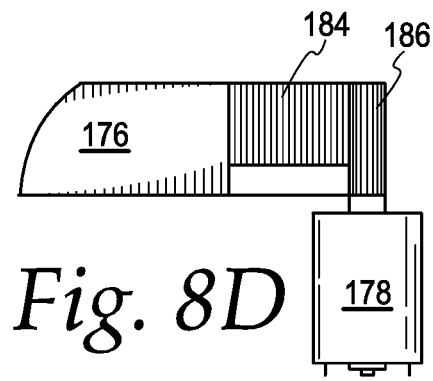
FIG. 8D is a top plan view of the lock piece of FIG. 8B.
Figure 8E:
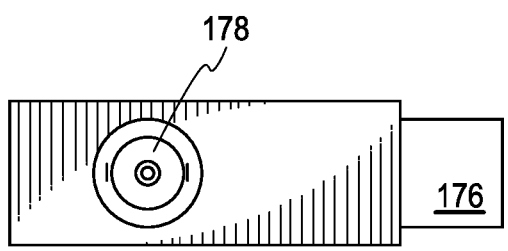
FIG. 8E is a rear side view of the lock assembly of FIG. 8A.
Figure 8F:
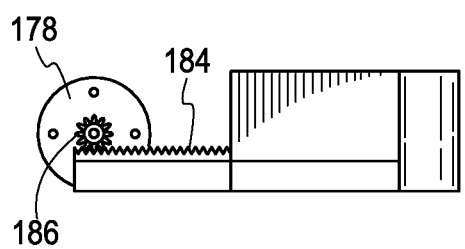
FIG. 8F is a rear side view of the lock piece of FIG. 8B.
Figure 9A:
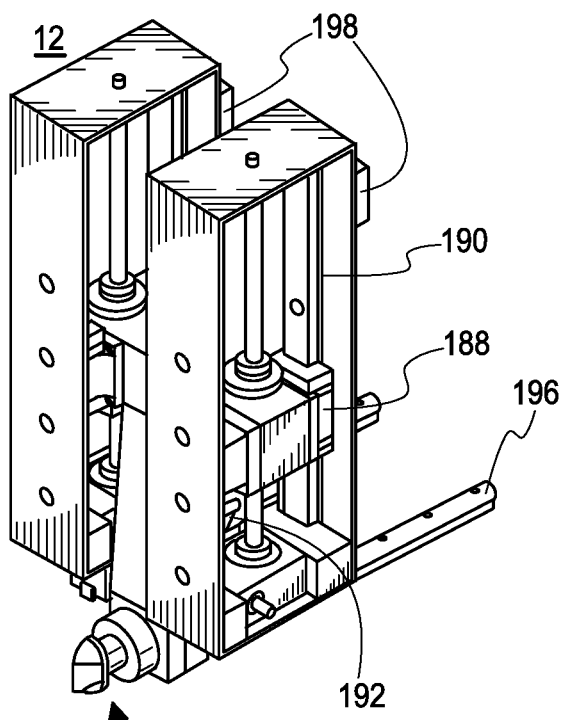
FIG. 9A is a perspective view of a lift assembly of a robot according to the principles of an embodiment of the present disclosure.
Figure 9B:
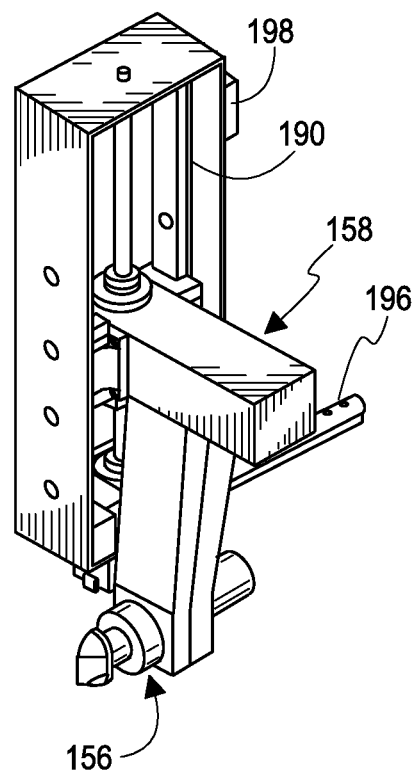
FIG. 9B is a perspective view of the lift assembly of FIG. 9A with a housing removed to illustrate a twist lock holder.
Figure 9C:
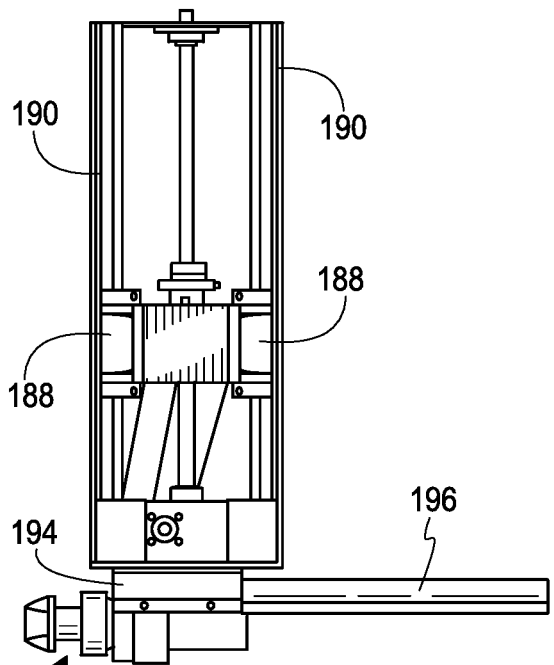
FIG. 9C is a side view of the lift assembly of FIG. 9B.
Figure 9D:
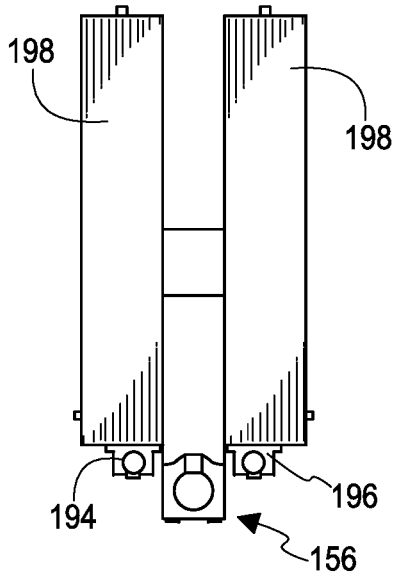
FIG. 9D is a front view of the lift assembly of FIG. 9A.

When the container is properly located and locked by four robots, the robots lift the container together, move their supports under each corner and then lower the container onto their supports. Before the robots then move the container as one, the horizontal movement of the lift system on the robot chassis is preferably locked. That said, and referring now to FIGS. 8A-F, an embodiment of the lock assembly 172 is shown. The lock assembly includes a lock housing 174, a lock piece 176 and a motor 178. The lock housing 172 keep the motor 178 and lock piece 176 together. The lock piece is shaped to stop the lift assembly from moving in one direction and allow it to slide by when it moves in the opposite direction. Specifically, and referring to FIG. 8C, it is the rounded edge 180 that allows the lift system to slide by, and the opposite flat edge 182 stops the lift system from sliding any further. The ridges (teeth) 184 on the lock piece 176 allow it to move according to the movement of the motor gear 186.

Turning back to the lift system assembly 12, FIGS. 9A-D illustrate the attachment to the corner casting of an intermodal container and lifting the container up and onto the chassis of the robot. The twistlock holder 158, and in turn the twisklock 156 is connected to the vertical lift rail carriage 188 which in turn is coupled to the vertical lift rail 190 which allows the twisklock holder 158 to move up and down via screwjack 192. The lift system assembly 12 further includes a horizontal round rail carriage 194 that rides a horizontal round rail 196. The lift housing 198 keeps the screwjack 192 and the vertical lift together and uses the round rail carriage 194 underneath it to move on the round rails 196 that allow the lift housing 198 to move forward and back on the robot 10.

FIGS. 10A-C are multiple views of the lift system described in FIGS. 9A-D raising the corner casting of an intermodal container. As the robots connect to the bottom corner castings 152 of the intermodal container, the lift systems work autonomously and simultaneously to lift the corner casting from the ground to the lift maximum height. The robot uses the twistlock to hold onto the corner casting and is able to lift the weight of the corner casting because of the lift system and the twistlock holder. The jack lift and the twistlock holder are able to resist and lift the weight of the corner casting without bending or breaking.

Figure 11A:
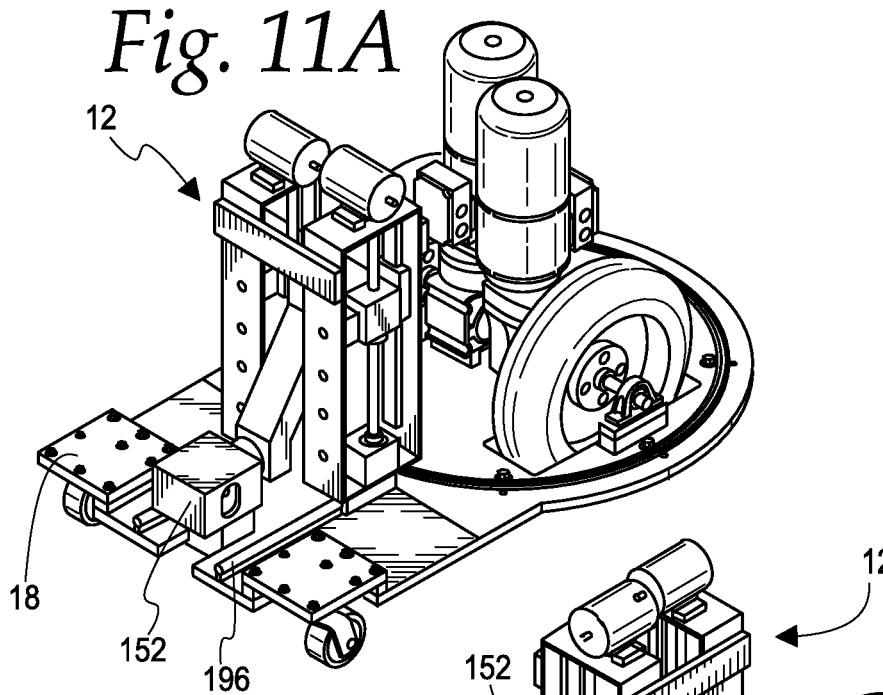
FIG. 11A is a perspective view of the support system of the robot of FIG. 1.
Figure 11B:
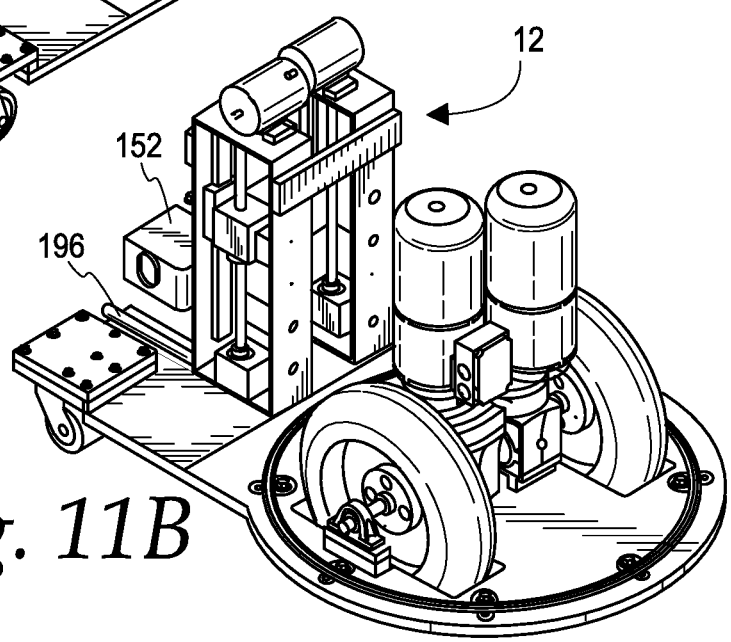
FIG. 11B is a rear perspective view of the support system of FIG. 11A.
Figure 11C:
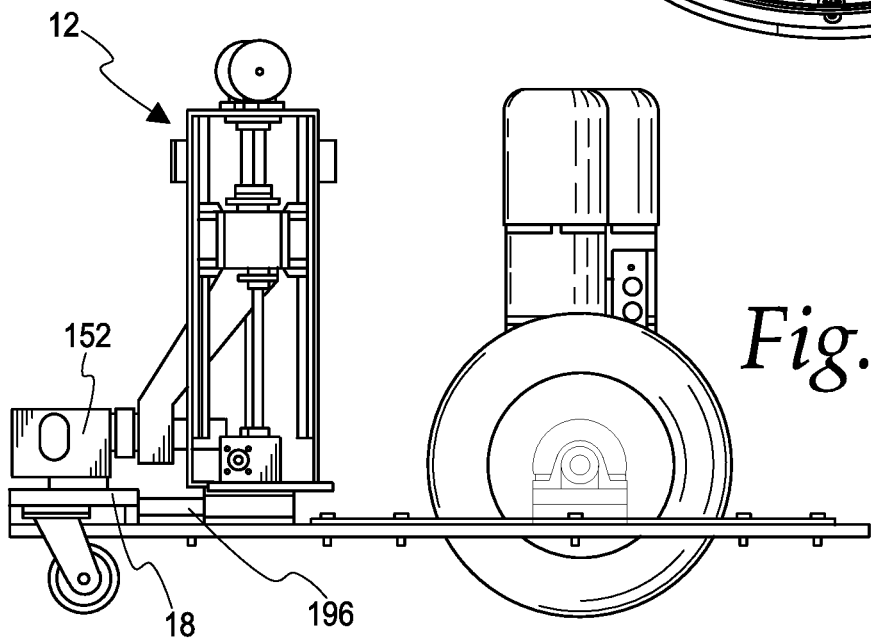
FIG. 11C is a side view of the support system of FIG. 11A.

Similarly, FIGS. 11A-C are multiple views of the robot lifting the corner castings onto a support block 18. Once the container is lifted and the lift assembly rides the rails inward, the robot lowers the corner castings onto a support column. The weight of the container will rest on the base plate but stability parallel to the ground will be maintained through the lift mechanism body.

Figure 12:
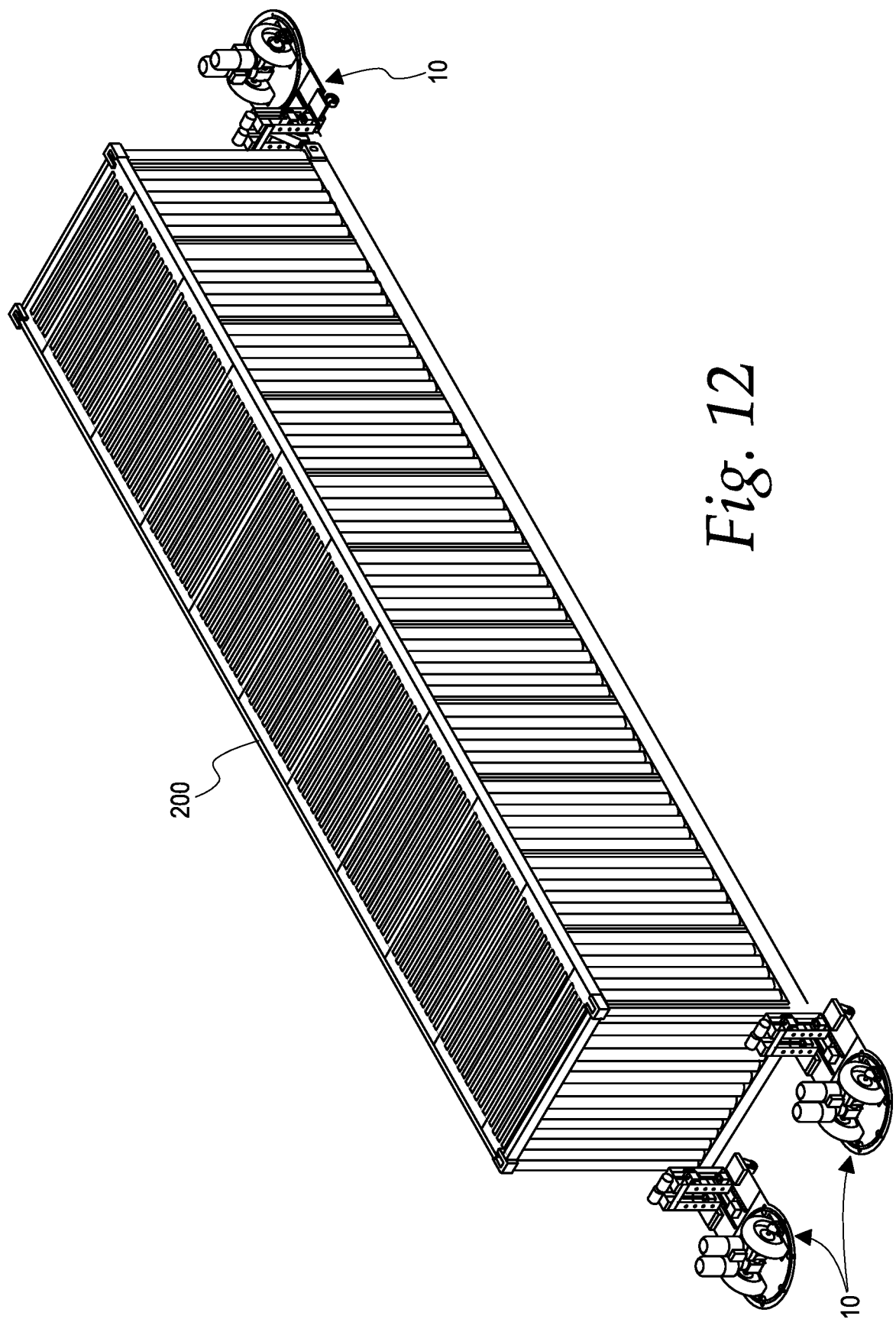
FIG. 12 is a perspective view of multiple robots of FIG. 1 engaged with a container.
Figure 15:
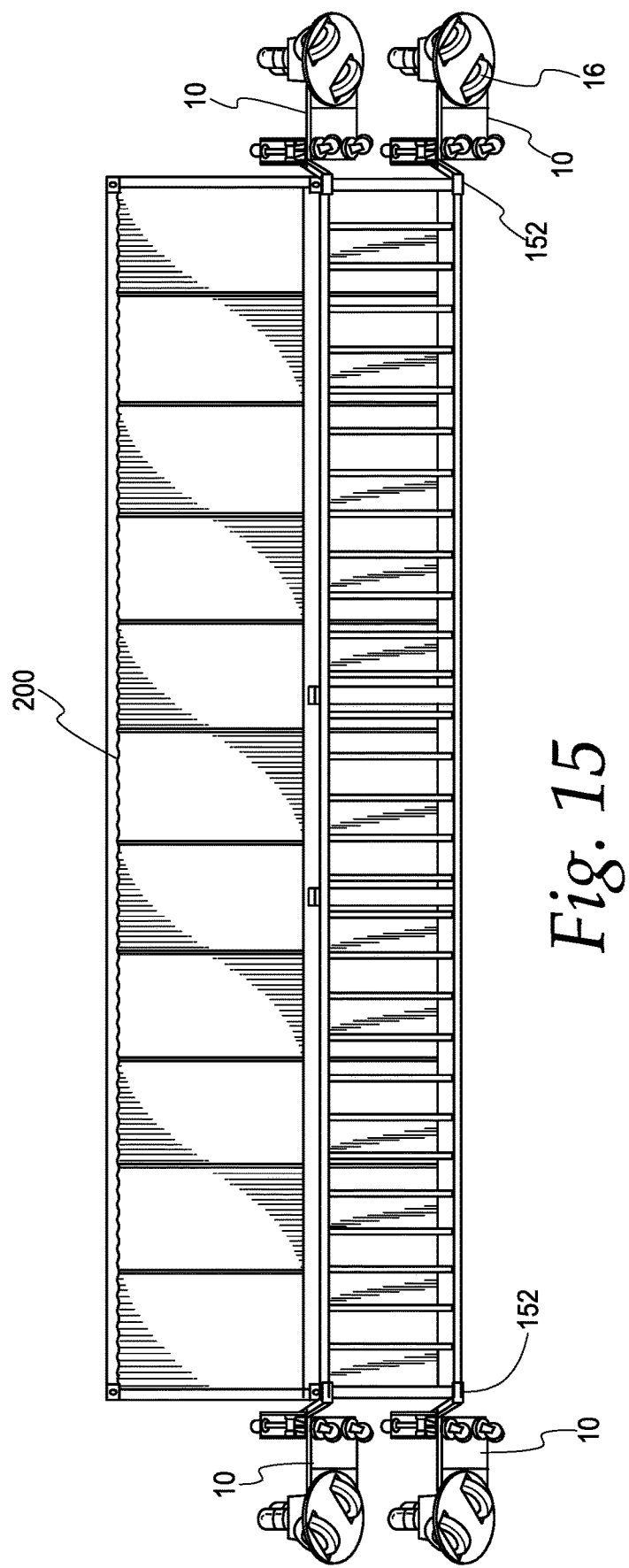
FIG. 15 is a bottom perspective view of FIG. 14.

FIG. 12 is an aerial perspective view of the robots 10 connecting to the corner castings 152 of an intermodal container 200 with the twisklock. The robots lock into the corner castings and after the robots have confirmed that all the twistlocks are secured they lift the container 200 simultaneously. In this configuration, the robots are able to lift and carry the container. Depending on the orientation of the wheels, the robot will be able to turn the container in any direction. FIG. 13 is a top plan view of the robots 10 of FIG. 12 locked into a shipping container 200 with their wheels 16 in an orientation for moving forward/backward. FIGS. 14 and 15 show the four robots 10 holding a shipping container 200 with the internal drive train at an angle of forty-five (45) degrees (just one of the many possible configurations possible with the internal rotating drive train). This particular configuration allows a sharp ninety (90) degree turn.

It will be appreciated that a single robot may include more than one engagement and/or lift mechanism. In other words, and for example, while the Figures have thus far illustrated robots with a single twist lock, they may include two twist locks. Accordingly, one larger robot may be capable of engaging and locking and lifting two corners of the intermodal container. In such embodiments, the container can be transported with two, three or four robots.

Figure 16:
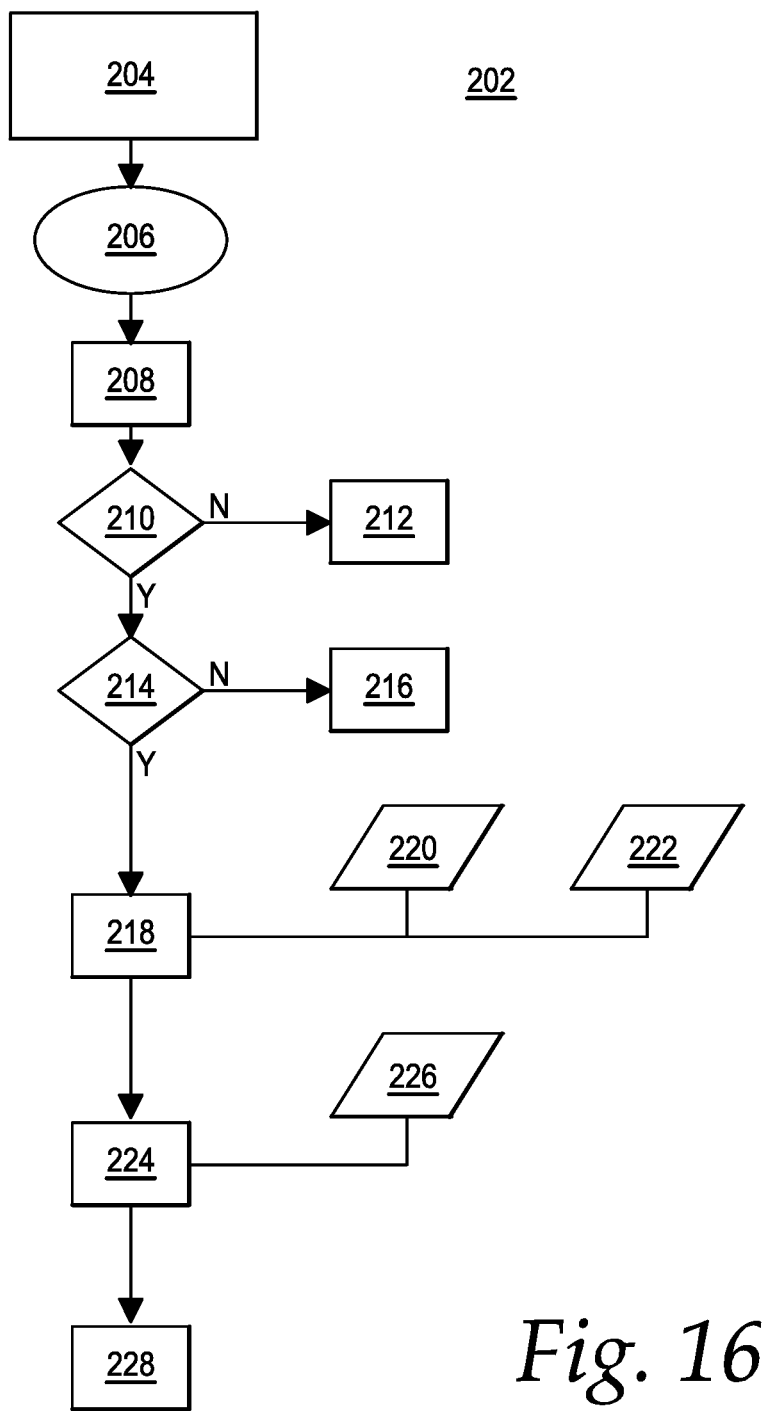
FIG. 16 is a simplistic logic flow diagram of the swarm pathfinding of the robots according to the principles of an embodiment of the present disclosure.
Figure 17A:
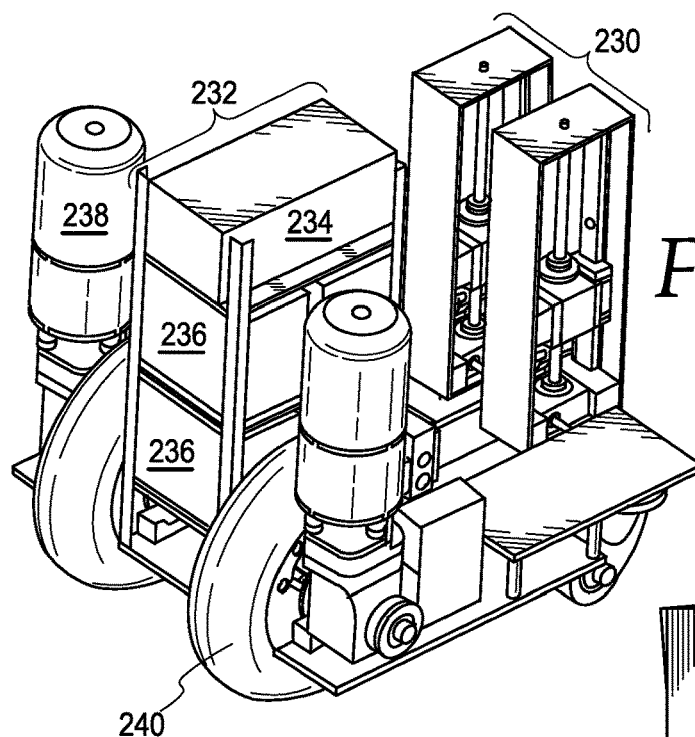
FIG. 17A is a perspective view of an alternate embodiment of a robot according to the principles of the present disclosure.
Figure 17B:
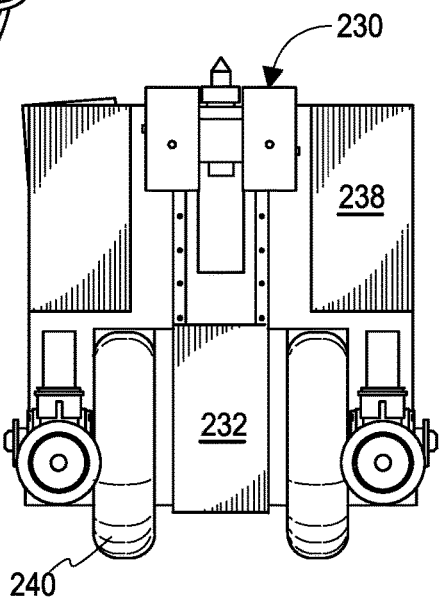
FIG. 17B is a frontal view of the robot of FIG. 17A.
Figure 17C:
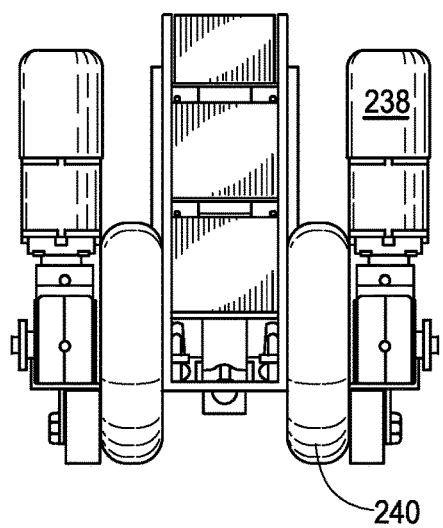
FIG. 17C is a rear view of the robot of FIG. 17A.
Figure 17D:
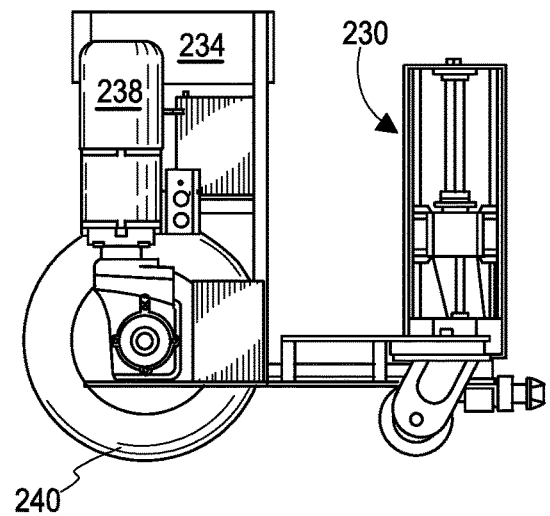
FIG. 17D is a side view of the robot of FIG. 17A.

In any event, after the robots have the subject container locked, lifted and supported, they are ready to collaborate with one another and transport it to the determined destination. FIG. 16 illustrates how the robots, when tied together on a container, follow a path generated by the main control server. This swarm pathfinding algorithm 202 allows the optimized movement along the path using swerve modules. This algorithm 202 splits the given path into four separate paths for each of the individual robots. The algorithm further prevents putting more stress on any single robot drive train. The algorithm starts with obtaining the path and heading list 204 for the container. Each element of the list should contain an x and y coordinate along with a heading expressed as an angle $\theta$ between 0 and 2Pi. With those elements it begins generating 206 four (for example) paths of the robots. The next point 208 in the path is obtained and it is determined 210 if the point on the heading function is continuous. If not, all robots stop at that point, rotate the container and continue 212. If so, it is determined 214 whether the point on the position function differentiable. If not, all robots stop at that point, rotate the container and continue 216. If so, the algorithm calculates u and v respectively 218, wherein $u=(w*\cos(\theta),w*(\theta))$ $v=(l*\sin(\theta),l*\cos(\theta))$ with w being half the width of the container 220 and l being half the length of the container 222. The algorithm then calculates $\{x_r,y_r\}=\{x_\theta,y_\theta\}\pm u\pm v$ 224 which is the position of the robot on the container 226. The robots then navigate to the point using a proportional integral derivative (PID) 228.

Mapping is continuous with robot power and will be accomplished both when the robots are moving a container together and when they are traveling individually. When moving a container, each group of robots share their own local map (e.g. a 2D map of their immediate surroundings). The robots rely on this map to avoid unexpected obstacles that the port-side software would not report. The lead robot receives a 2D point map from each slave robot with each control cycle. During each control cycle, the lead robot will consolidate and average the four (for example) individual robot maps into one 2D map. The lead robot will then make decisions based on this averaged map such as instructing the robot "team" to stop when a person walks by. When moving individually, every robot will generate a local map when moving individually and the robot will make decisions based on this local map generated from sensor data.

It will be understood that alternate embodiments of robots and features/elements thereof may be used with the system for intermodal container transport. For example, FIGS. 17A-D illustrate a full assembly of an alternate embodiment wherein the lift assembly 230 is used to lift an intermodal container by connecting to the corner casting. A battery rack 232 provides power for the electronic and mechanical systems; and holds an inverter 234 on the top shelf and four batteries 236 on the two shelves below. Alternatively, this embodiment, and indeed all robot embodiments may be powered by a combustible engine source, a hybrid gas and battery configuration or any other applicable power source. In any event, the drive motors 238 control the movement of the drive wheels 240 and the caster wheels 242 are used to support the front of the robot and also allow for movement.

Figure 18A:
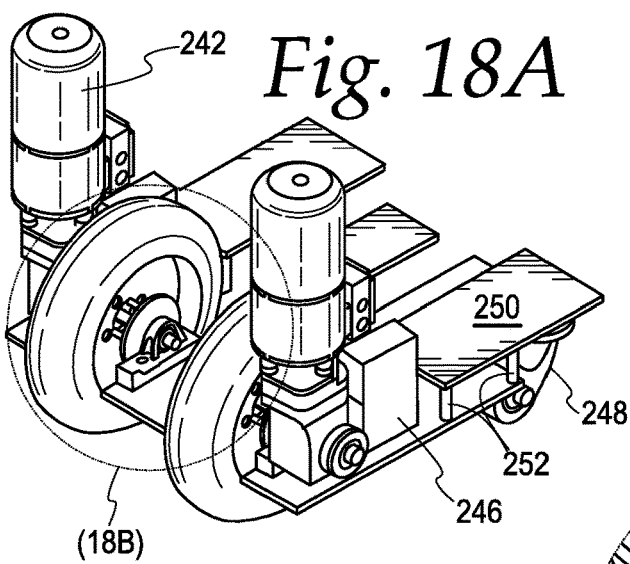
FIG. 18A is perspective view of an alternate embodiment of a robot drive system according to the principles of the present disclosure.
Figure 18B:
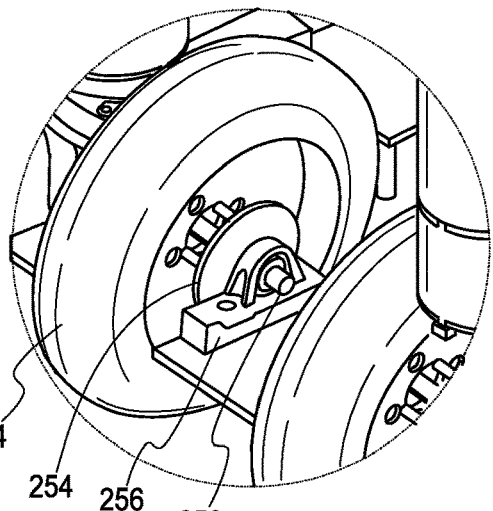
FIG. 18B is an enlarged view of the drive system of the robot of FIG. 18A.
Figure 18C:
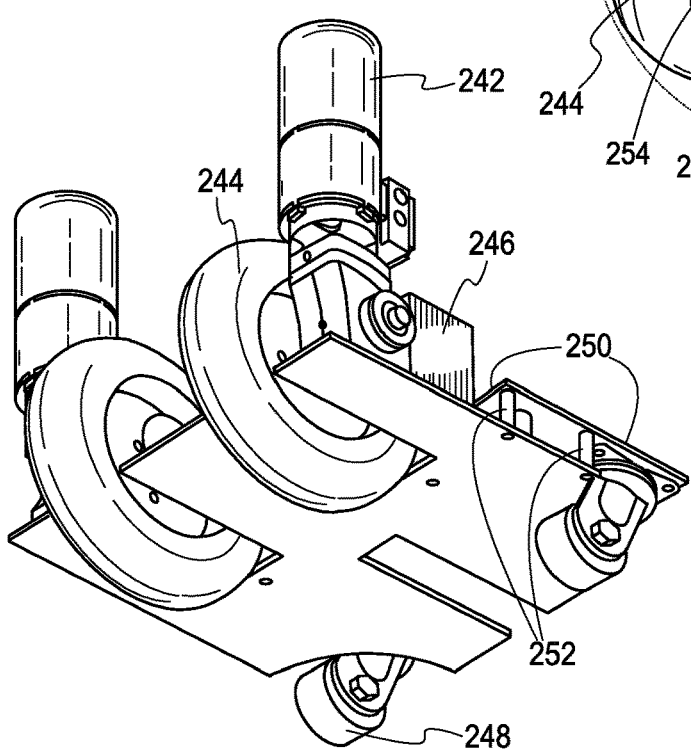
FIG. 18C is a bottom perspective view of the robot of FIG. 18A.
Figure 18D:
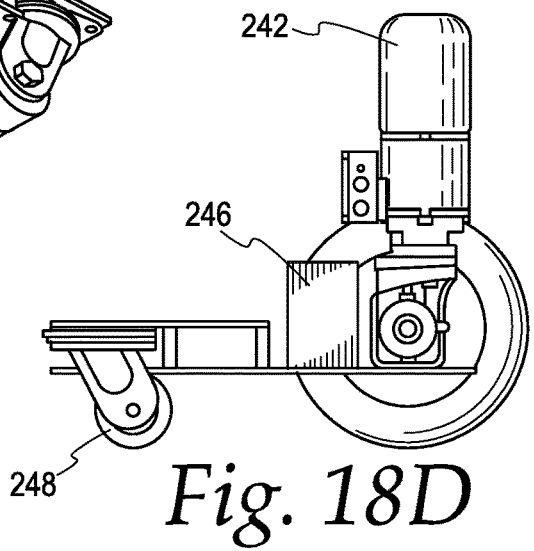
FIG. 18D is a side view of the robot of FIG. 18A.

The drive system of the robot of FIGS. 17A-D is illustrated in FIGS. 18A-18D. In particular, the drive motor 242 controls the movement of the drive wheels 244 through the coupled VFD 246. The caster wheels 248 are used to support the front of the robot and the caster plate 250 is attached to threaded rods 252 that are used to change the height of the caster wheels 248 to allow both the casters and drive wheels to be at the same height and to keep the robot level. A closer look at the wheel assembly in FIG. 18B illustrates the hubs 254, the bearing 256 and the drive wheel 258.

An alternate embodiment of the twist lock 260 assembly (e.g. modified Sea Box SB 241 twist lock and the like) is illustrated in FIGS. 19A-19D. The twist lock engaging end 262 has an integral gear 264 near its other end which interfaces with the gear 266 of the motor 268 (e.g. mini-CIM motor and the like). The gears are respectfully protected with twist 270 and motor 272 gear covers. In use the twist lock is inserted into the corner castings by the robot, the motor rotates the lock 90 degrees and holds it securely in place for subsequent lift/transport.

Figure 20A:
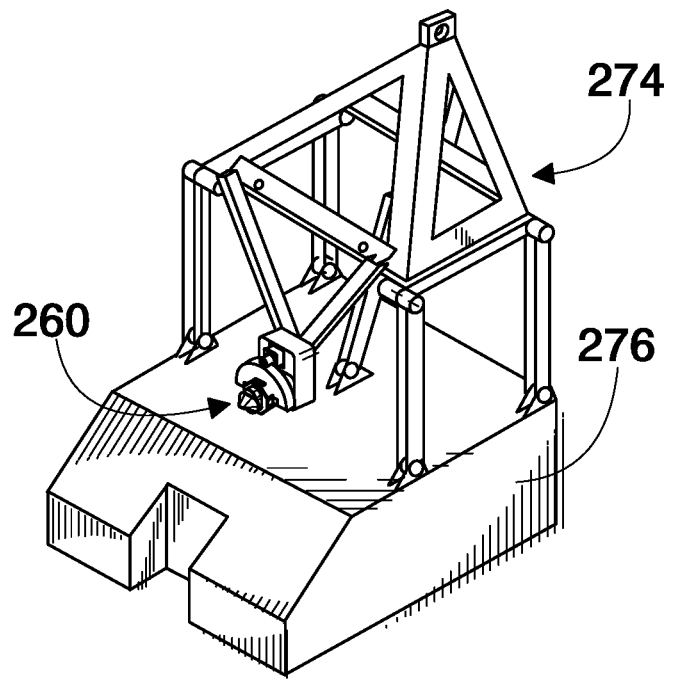
FIG. 20A is a perspective view of an alternate lift mechanism with twist lock according to the principles of the present disclosure.
Figure 20B:
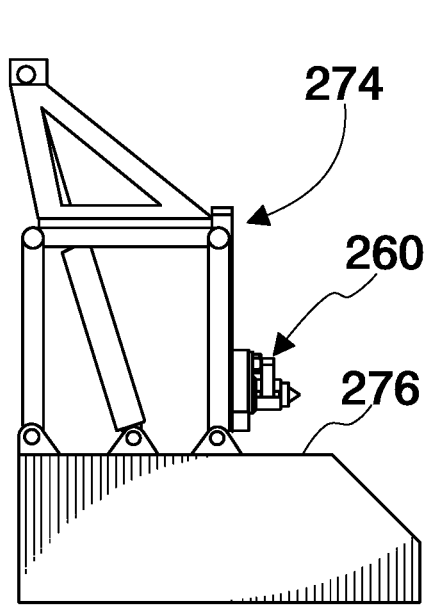
FIG. 20B is a side view of the mechanism of FIG. 20A.
Figure 20C:
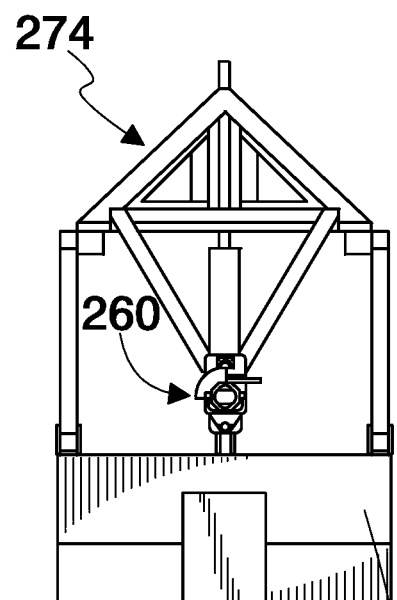
FIG. 20C is a front view of the mechanism of FIG. 20A.

The lift mechanism 274 that can be used with the twist lock assembly 260 of FIG. 19, for example, is illustrated in FIGS. 20A-20C. When four robots (for example) connect to four bottom corner castings on a shipping container using the twist lock assembly 260, the container can be lifted. Once confirmation of a secure lock, the robots will simultaneously lift the container. The lift mechanism 274 is constructed from four bar linkages and will lift the container up, and then move it back onto the robot base 276 so that the weight of the container is over the center of the robot. As previously noted, the robots are able to lift and carry the container automatically and without explicit human command. Once up and supported, the wheels on the robot will be able to move and carry the container in any direction.

Figure 21:
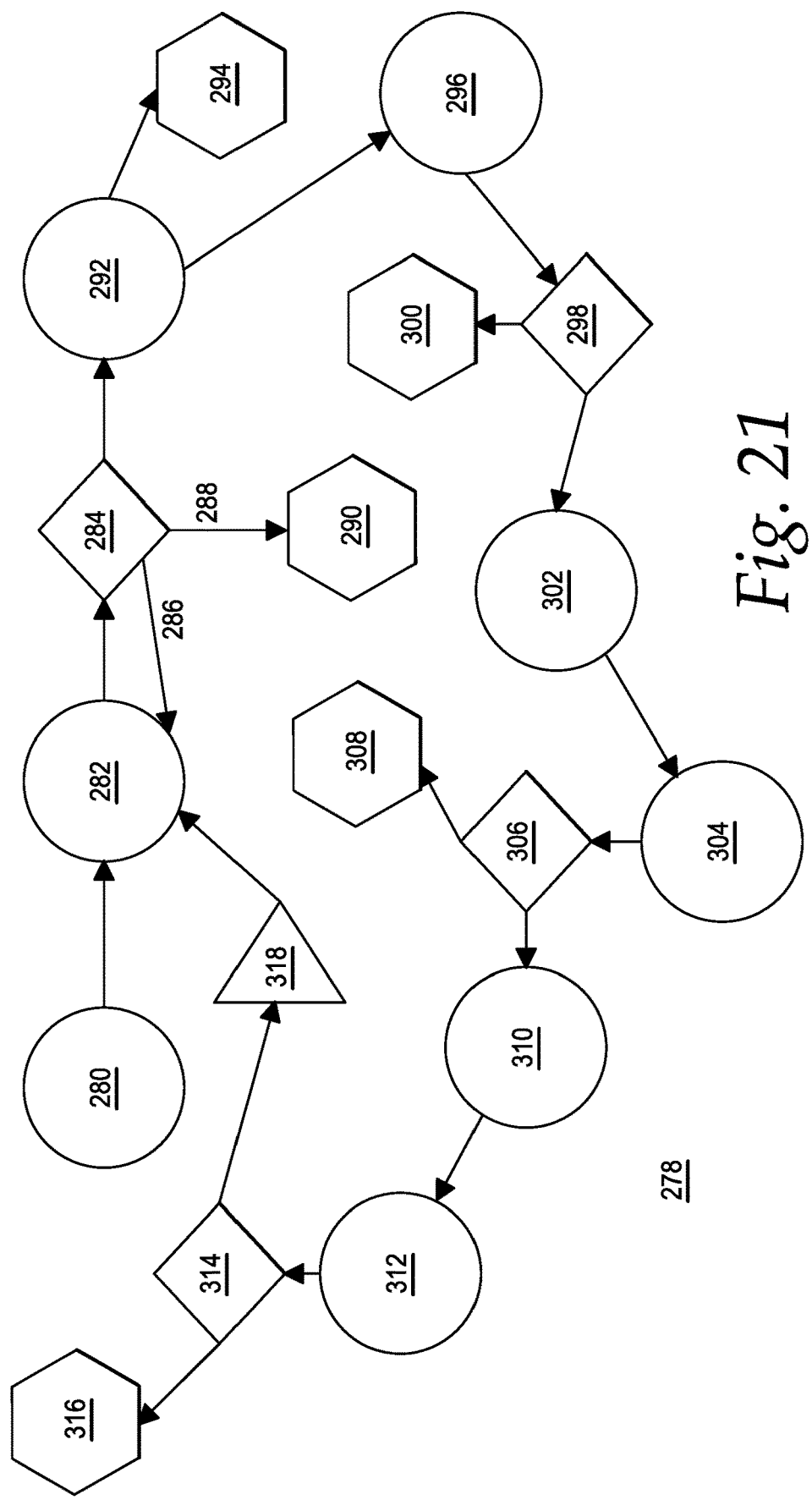
FIG. 21 is a simplistic logic flow diagram of the lifting procedures of the robots according to an embodiment of the principles of the present disclosure.
Figure 22B:
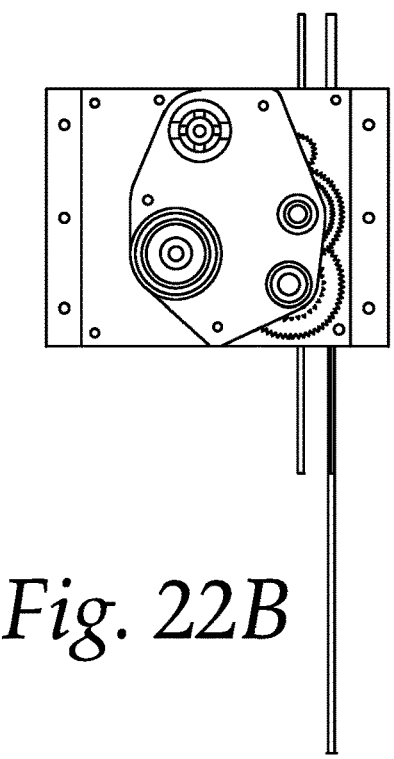
FIG. 22B is a top view of the swerve assembly of FIG. 22A.
Figure 22A:
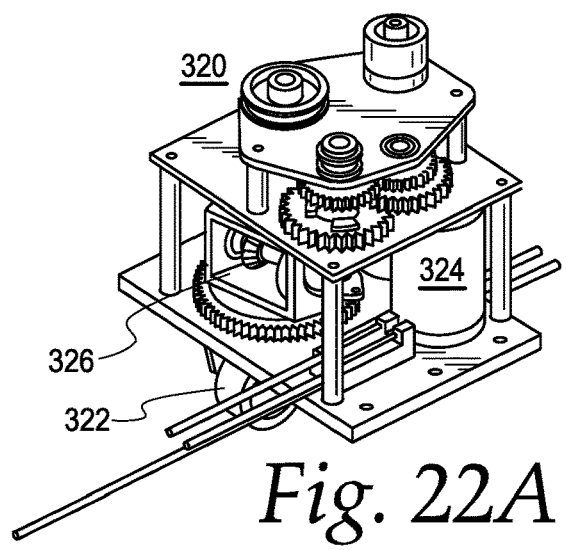
FIG. 22A is a perspective view of an alternate embodiment of a swerve assembly according to the principles of the present disclosure.
Figure 22C:
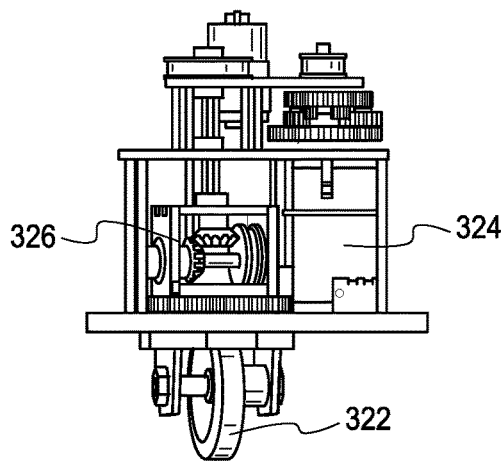
FIG. 22C is a front view of the swerve assembly of FIG. 22A.
Figure 22E:
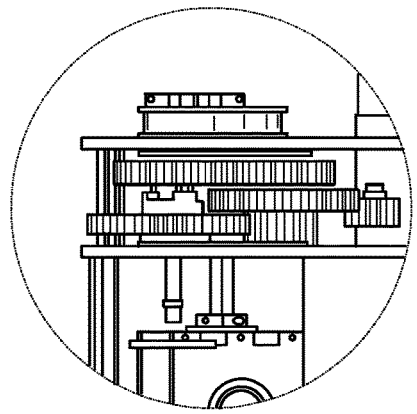
FIG. 22E is an enlarged view of Section E of the swerve assembly of FIG. 22D.
Figure 22D:
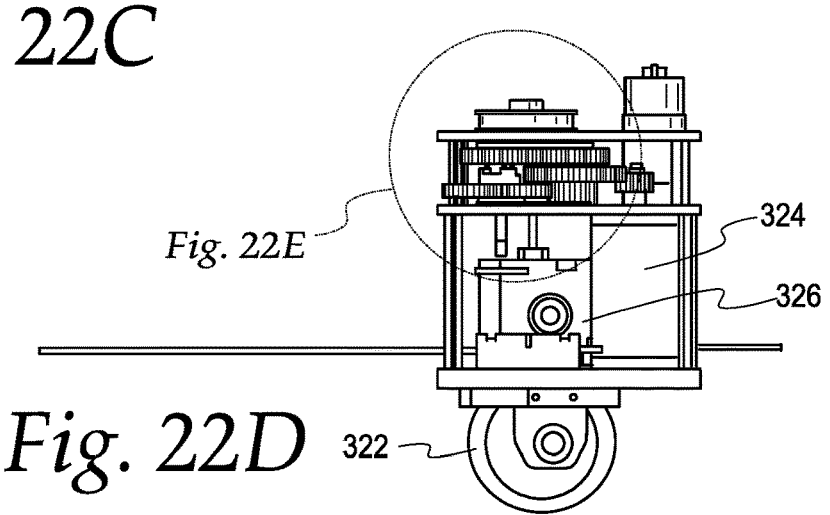
FIG. 22D is a side view of the swerve assembly of FIG. 22A.
Figure 23A:
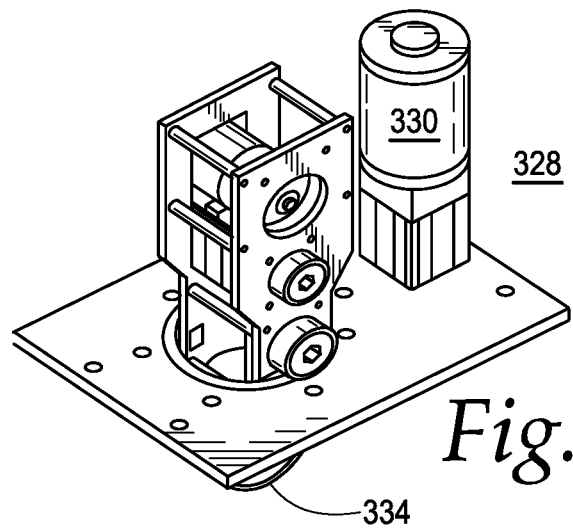
FIG. 23A is a perspective view of another alternate embodiment of a swerve drive according to the principles of the present disclosure.
Figure 23B:
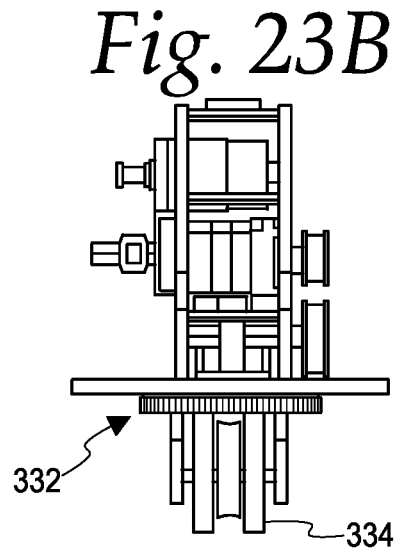
FIG. 23B is a front view of the swerve drive of FIG. 23A.
Figure 23C:
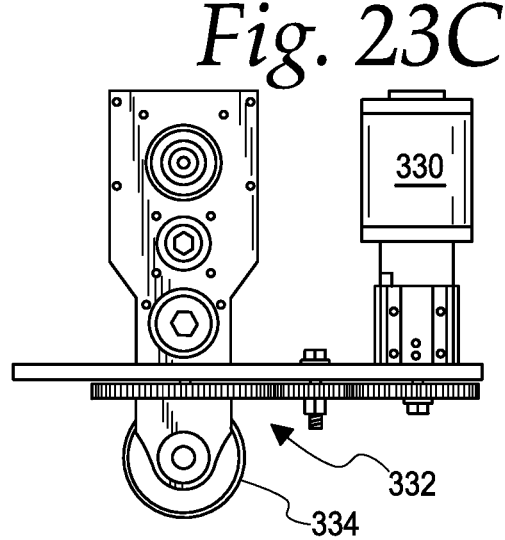
FIG. 23C is a side view of the swerve drive of FIG. 23A.
Figure 23D:
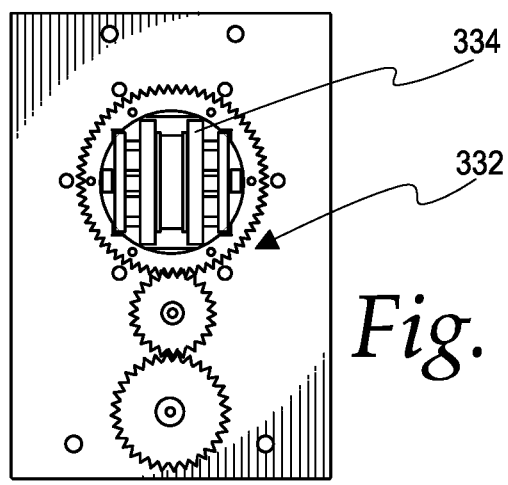
FIG. 23D is a bottom view of the swerve drive of FIG. 23A.

The lifting procedures of the robots of the present disclosure are exemplified in the simplistic flow diagram 278 of FIG. 21. In particular, at robot power up 280, the mechanism goes to home position and an idle state. Once a command to lock into a container is received, the robot attempts to lock 282. The locking logic 284 will retry 286 up to three times with the forth fail resulting in an error state report 290 to the master. When the robot is locked on it send an all good flag 292. If all robots do not get locked on, then an error 294 reporting such lock on failure is sent. Once all robots pass the lock process 296, the lift logic 298 starts. If there is a mechanical and/or overweight issue, such an error 300 will be reported, otherwise the lift is completed and a flag is sent 302 to let the drive motor proceed to location. Once arrived, the robots receive the command to lower 304 the container and proceeds through the lowering logic 306. If there is an issue lowering the container, such an error is sent 308, otherwise lower lift completes 310. The robots then receive the unlock command 312 and proceed through that logic 314. Should an issue occur during unlock, such an error is reported 316, otherwise the robots go idle 318 until the next lock command 282.

An alternate embodiment of the swerve assembly 320 is shown in FIGS. 22a-22E. This module allows the robot to move in any direction translationally. Using an independently driven wheel 322 and motor 324 driven yaw the robot is capable of exact directional control. The module features a dog clutch two speed drivetrain 326 that minimizes drive time between containers.

Another alternate embodiment of the swerve assembly 328 is shown in FIGS. 23A-23D. This module utilizes an independent drive motor 330 and yaw motor 332 to move the robot in any direction translationally via wheel 334. It has a turret design with the drive motors and wheels inside. The entire turret can swerve through the outside yaw motor.

Figure 24A:
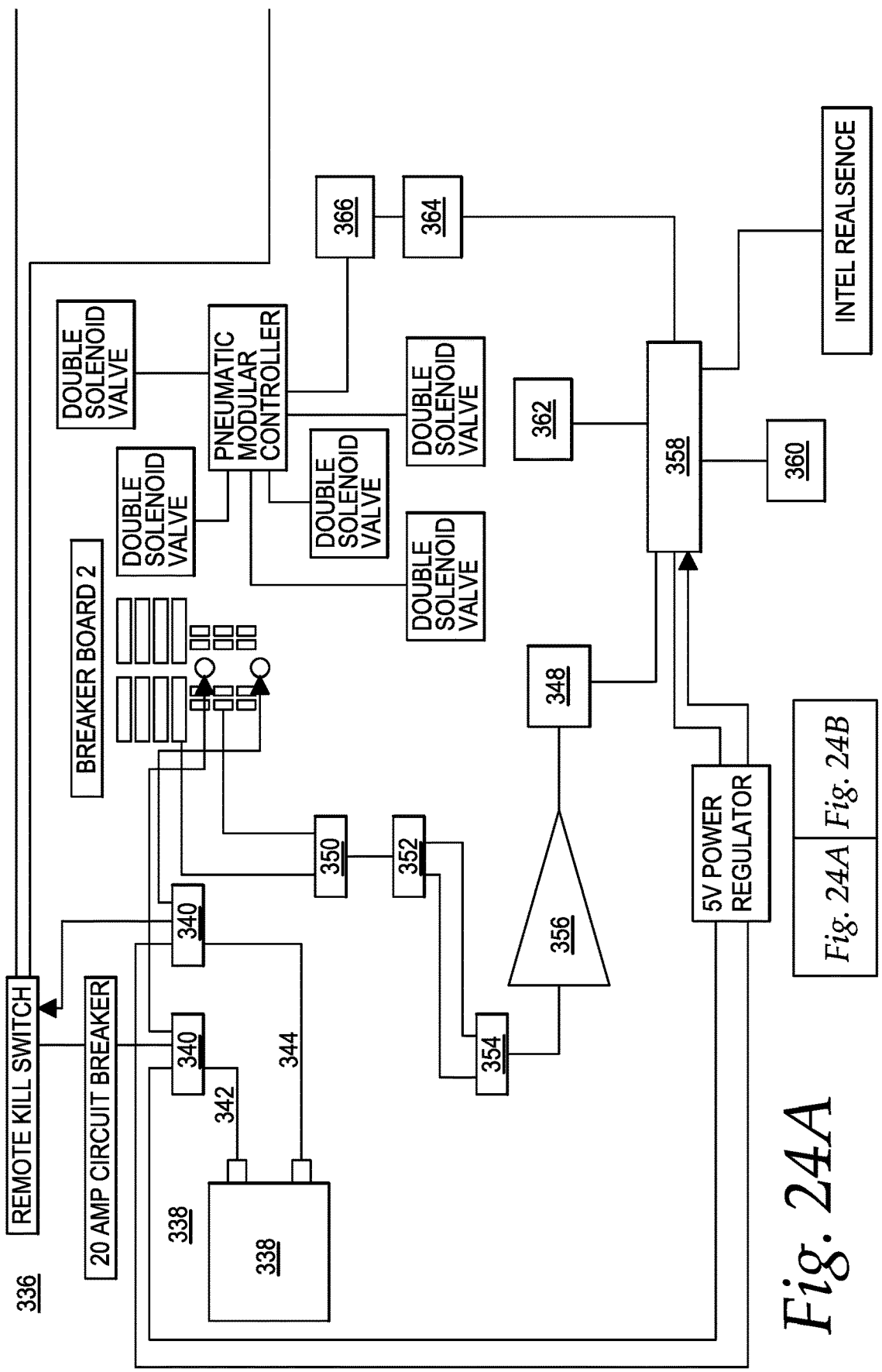
FIG. 24A is half of a simplified overall electrical layout of a robot according to the principles of the present disclosure.
Figure 24B:
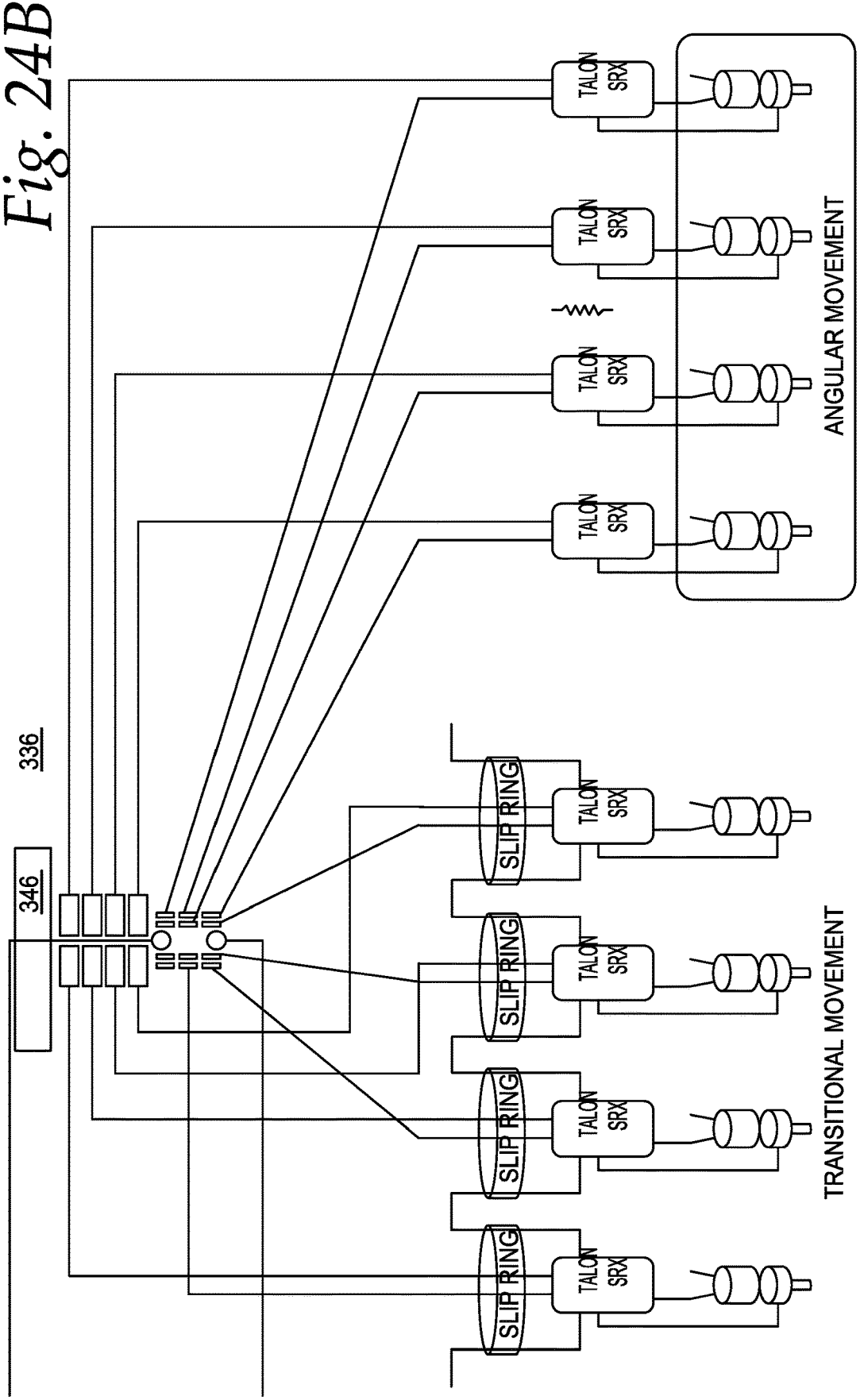
FIG. 24B is the other half of the layout of FIG. 24A.

The overall electrical layout of an embodiment of a robot of the present disclosure will be shown and described via FIGS. 24A-24B. In particular, the current from the battery 338 is split into two paths via two terminal blocks 340. One terminal block is to split the power line 342 and the other terminal block is to split the ground line 344. One of the split paths of the terminal blocks is used to power the breaker board 346. The breaker board 346 is there to open the circuit in the event of any current spikes, which could damage the electronics of the robot. The breaker board 346 is then used to power the Talon SRX system (for example), which includes the motors, motor controllers and wheels. The breaker board 346 is also used to power the LIDAR through a transformer to step up the voltage to 32 volts.

The other split path from the terminal blocks is used to power the Jetson TX2 (for example) 348. This power is sent through a 5 Amp circuit breaker 350 and manual toggle switch 352. Next, the voltage is stepped to 19 volts using a transformer 354 before it is converted into a single line via a barrel-jack breakout 356 and then sent to the Jetson TX2 348.

From the Jetson TX2 348, virtually all the hardware receives their commands. The LIDAR is connected to the Jetson TX2 348 in order to increase the amount of hardware that can be connected. This may include a camera 360 for vision processing, a XBEE system 362 for communications, and the swerve modules—all connected by USB ports. The swerve module includes the Gaggeteer 364 and HERO board 366. The HERO board 366 send commands to the Talon SRX system via CAN protocol.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

What is claimed is:

1. A multi robot system for transport of an intermodal container positioned on a support surface and having corner castings, said system comprising:
   a central command server having container location information including a start location and a stop location;
   said server locates two or more autonomous robots for transport of said container along a transport path from said start location to said stop location;
   said two or more autonomous robots each capable of communicating information, including location information, with said server and with each other through a communications network;
   said server establishes communications with at least one of said two or more robots and sends said location information, through said network, to said at least one of said two or more robots whereby said at least one of said two or more robots establishes communications with the other of said two or more robots to synchronize and locate said container at said start location; and
   said two or more robots each engaging a corner castings of said container and lifting said container off of said support surface and transporting said container along said transport path whereby said two or more robots split said transport path into synchronized separate paths to said stop location.

2. The system as defined in claim 1 wherein said robot locks into an engaged corner casting.

3. The system as defined in claim 1 wherein said robot includes a base support for supporting said container during transport.

4. The system as defined in claim 1 wherein said robots include sensors to optimize obstacle avoidance during movement.

5. The system as defined in claim 1 wherein said robots utilize a pathfinding algorithm to optimize container transport movement.

6. The system as defined in claim 1 wherein said communications network includes a mesh wireless protocol whereby said server communicates with a nearest robot and said nearest robot communicates with any remaining robots.

7. A master swarm robot configured to collaborate with a central command server and at least a second swarm robot to transport a single intermodal container positioned on a support surface and having corner castings, said master robot comprising:
- a communications module for establishing communication with said server and said second swarm robot whereby said master robot receives location information, including a start location and a stop location and a transport path for said container therebetween, and sends said location information to a second robot;
- a drive module including a central processing unit for moving said robot over said support surface;
- a corner casting engagement member for engaging a corner casting of said container; and
- a lift mechanism for lifting said engagement member whereby when said engagement member is engaged with said engaged corner casting said container is lifted off of said support surface.

8. The robot as defined in claim 7 wherein said drive module enables 360 degree movement.

9. The robot as defined in claim 7 wherein said robot includes a base support for supporting said container during transport.

10. The robot as defined in claim 7 wherein said robot includes a LIDAR sensor.

11. The robot as defined in claim 7 wherein said robot includes an ultrasonic sensor.

12. The robot as defined in claim 7 wherein said communications module further establishes communication with a central command server.

13. The robot as defined in claim 7 wherein said robot locks into said engaged corner casting.

14. The robot as defined in claim 13 wherein said robot locks with a twist lock.

15. A multi robot method of transporting an intermodal container positioned on a support surface and having corner castings, said method comprising:
- establishing communications between a central command server and at least one autonomous robot through a communication network;
- establishing communications between said at least one robot and another robot through a communication network;
- sending container location information through said network from said server to said at least one robot;
- sending container location information through said network from said at least one robot to said another robot
- said two or more robots synchronizing and locating said container at a start location;
- said two or more robots engaging said container through said corner castings;
- said two or more robots lifting said container; and
- said two or more robots transporting said container along a transport path whereby said two or more robots split said transport path into synchronized separate paths to a stop location.

16. The method as defined in claim 15 further comprising said robots locking into said corner castings.

17. The method as defined in claim 16 further comprising said robots unlocking said container upon reaching said stop location.

18. The method as defined in claim 15 further comprising said robots supporting said container during transport.

19. The method as defined in claim 15 further comprising said robots lowering said container upon reaching said stop location.

20. The method as defined in claim 15 further comprising said robots disengaging said corner castings.

* * * * *